(12) United States Patent
Garside et al.

(10) Patent No.: US 9,081,778 B2
(45) Date of Patent: Jul. 14, 2015

(54) USING DIGITAL FINGERPRINTS TO ASSOCIATE DATA WITH A WORK

(71) Applicant: Audible Magic Corporation, Los Gatos, CA (US)

(72) Inventors: Vic Garside, Los Gatos, CA (US); Jay Friedman, Monte Sereno, CA (US); James Schrempp, Saratoga, CA (US); Robert Williams, San Jose, CA (US)

(73) Assignee: Audible Magic Corporation, Los Gatos, CA (US)

( * ) Notice: Subject to any disclaimer, the term of this patent is extended or adjusted under 35 U.S.C. 154(b) by 278 days.

(21) Appl. No.: 13/626,709

(22) Filed: Sep. 25, 2012

(65) Prior Publication Data

US 2014/0089307 A1    Mar. 27, 2014

(51) Int. Cl.
*G06F 17/30* (2006.01)

(52) U.S. Cl.
CPC .... *G06F 17/30023* (2013.01); *G06F 17/30743* (2013.01); *G06F 17/30784* (2013.01)

(58) Field of Classification Search
USPC .................. 707/607, 609, 705, 790, 813, 821
See application file for complete search history.

(56) References Cited

U.S. PATENT DOCUMENTS

| | | | |
|---|---|---|---|
| 3,919,479 A | 11/1975 | Moon et al. | |
| 4,230,990 A | 10/1980 | Lert, Jr. et al. | |
| 4,449,249 A | 5/1984 | Price | |
| 4,450,531 A | 5/1984 | Kenyon | |
| 4,454,594 A | 6/1984 | Heffron et al. | |
| 4,623,837 A | 11/1986 | Efron et al. | |
| 4,677,455 A | 6/1987 | Okajima | |
| 4,677,466 A | 6/1987 | Lert et al. | |
| 4,739,398 A | 4/1988 | Thomas et al. | |
| 4,843,562 A | 6/1989 | Kenyon et al. | |
| 4,918,730 A | 4/1990 | Schulze | |
| 5,210,820 A | 5/1993 | Kenyon | |
| 5,247,688 A | 9/1993 | Ishigami | |
| 5,283,819 A | 2/1994 | Glick | |
| 5,327,521 A | 7/1994 | Savic et al. | |
| 5,437,050 A | 7/1995 | Lamb et al. | |
| 5,442,645 A | 8/1995 | Ugon | |
| 5,504,518 A | 4/1996 | Ellis | |
| 5,581,658 A | 12/1996 | O'Hagan et al. | |
| 5,588,119 A | 12/1996 | Vincent | |
| 5,612,729 A | 3/1997 | Ellis et al. | |

(Continued)

FOREIGN PATENT DOCUMENTS

| | | |
|---|---|---|
| EP | 0349106 | 1/1990 |
| EP | 0402210 | 6/1990 |

(Continued)

OTHER PUBLICATIONS

International Search Report and Written Opinion mailed Apr. 15, 2014 for PCT Application No. PCT/US2013/061750.

(Continued)

*Primary Examiner* — Sana Al Hashemi
(74) *Attorney, Agent, or Firm* — Lowenstein Sandler LLP

(57) ABSTRACT

A computing device, during sampling or playback of a work, receives a command to associate data with the work at a particular point in the work. The computing device generates a digital fingerprint of a segment of the work, wherein the segment corresponds to the particular point in the work. The computing device then associates the data with the digital fingerprint.

30 Claims, 12 Drawing Sheets

(56) References Cited

U.S. PATENT DOCUMENTS

| | | |
|---|---|---|
| 5,612,974 A | 3/1997 | Astrachan |
| 5,613,004 A | 3/1997 | Cooperman et al. |
| 5,638,443 A | 6/1997 | Stefik |
| 5,692,213 A | 11/1997 | Goldberg et al. |
| 5,701,452 A | 12/1997 | Siefert |
| 5,710,916 A | 1/1998 | Barbara et al. |
| 5,724,605 A | 3/1998 | Wissner |
| 5,732,193 A | 3/1998 | Aberson |
| 5,758,257 A | 5/1998 | Herz et al. |
| 5,850,388 A | 12/1998 | Anderson |
| 5,862,260 A | 1/1999 | Rhoads |
| 5,881,182 A | 3/1999 | Fiete et al. |
| 5,918,223 A | 6/1999 | Blum et al. |
| 5,924,071 A | 7/1999 | Morgan et al. |
| 5,930,369 A | 7/1999 | Cox et al. |
| 5,930,749 A | 7/1999 | Maes |
| 5,943,422 A | 8/1999 | Van Wie et al. |
| 5,949,885 A | 9/1999 | Leighton |
| 5,959,659 A | 9/1999 | Dokic |
| 5,983,176 A | 11/1999 | Hoffert et al. |
| 6,006,183 A | 12/1999 | Lai et al. |
| 6,006,256 A | 12/1999 | Zdepski et al. |
| 6,011,758 A | 1/2000 | Dockes |
| 6,012,051 A | 1/2000 | Sammons |
| 6,026,411 A | 2/2000 | Delp |
| 6,026,439 A | 2/2000 | Chowdhury |
| 6,044,402 A | 3/2000 | Jacobson |
| 6,067,369 A | 5/2000 | Kamei |
| 6,067,517 A | 5/2000 | Bahl et al. |
| 6,088,455 A | 7/2000 | Logan et al. |
| 6,092,040 A | 7/2000 | Voran |
| 6,096,961 A | 8/2000 | Bruti |
| 6,118,450 A | 9/2000 | Proehl et al. |
| 6,192,340 B1 | 2/2001 | Abecassis |
| 6,195,693 B1 | 2/2001 | Berry |
| 6,229,922 B1 | 5/2001 | Sasakawa et al. |
| 6,243,615 B1 | 6/2001 | Neway |
| 6,243,725 B1 | 6/2001 | Hempleman et al. |
| 6,253,193 B1 | 6/2001 | Ginter |
| 6,253,337 B1 | 6/2001 | Maloney et al. |
| 6,279,010 B1 | 8/2001 | Anderson |
| 6,279,124 B1 | 8/2001 | Brouwer et al. |
| 6,285,596 B1 | 9/2001 | Miura et al. |
| 6,330,593 B1 | 12/2001 | Roberts et al. |
| 6,345,256 B1 | 2/2002 | Milsted et al. |
| 6,345,274 B1 | 2/2002 | Zhu |
| 6,360,265 B1 | 3/2002 | Falck et al. |
| 6,363,381 B1 | 3/2002 | Lee et al. |
| 6,370,513 B1 | 4/2002 | Kolawa |
| 6,374,260 B1 | 4/2002 | Hoffert et al. |
| 6,385,596 B1 | 5/2002 | Wiser |
| 6,418,421 B1 | 7/2002 | Hurtado et al. |
| 6,422,061 B1 | 7/2002 | Sunshine |
| 6,425,081 B1 | 7/2002 | Iwamura |
| 6,434,520 B1 | 8/2002 | Kanevsky et al. |
| 6,438,556 B1 | 8/2002 | Malik et al. |
| 6,449,226 B1 | 9/2002 | Kumagai |
| 6,452,874 B1 | 9/2002 | Otsuka et al. |
| 6,453,252 B1 | 9/2002 | Laroche |
| 6,460,050 B1 | 10/2002 | Pace et al. |
| 6,463,508 B1 | 10/2002 | Wolf et al. |
| 6,477,704 B1 | 11/2002 | Cremia |
| 6,487,641 B1 | 11/2002 | Cusson et al. |
| 6,490,279 B1 | 12/2002 | Chen et al. |
| 6,496,802 B1 | 12/2002 | van Zoest et al. |
| 6,526,411 B1 | 2/2003 | Ward |
| 6,542,869 B1 | 4/2003 | Foote |
| 6,550,001 B1 | 4/2003 | Corwin et al. |
| 6,550,011 B1 | 4/2003 | Sims, III |
| 6,552,254 B2 | 4/2003 | Hasegawa et al. |
| 6,570,991 B1 | 5/2003 | Scheirer et al. |
| 6,591,245 B1 | 7/2003 | Klug |
| 6,609,093 B1 | 8/2003 | Gopinath et al. |
| 6,609,105 B2 | 8/2003 | Story et al. |
| 6,628,737 B1 | 9/2003 | Timus |
| 6,636,965 B1 | 10/2003 | Beyda |
| 6,654,757 B1 | 11/2003 | Stern |
| 6,675,174 B1 | 1/2004 | Bolle et al. |
| 6,690,835 B1 | 2/2004 | Brockmeyer et al. |
| 6,714,921 B2 | 3/2004 | Pirolli et al. |
| 6,732,180 B1 | 5/2004 | Hale |
| 6,771,316 B1 | 8/2004 | Iggulden |
| 6,771,885 B1 | 8/2004 | Agnihotri et al. |
| 6,788,800 B1 | 9/2004 | Carr et al. |
| 6,834,308 B1 | 12/2004 | Ikezoye et al. |
| 6,947,909 B1 | 9/2005 | Hoke, Jr. |
| 6,968,337 B2 | 11/2005 | Wold |
| 6,990,453 B2 | 1/2006 | Wang et al. |
| 7,043,536 B1 | 5/2006 | Philyaw |
| 7,047,241 B1 | 5/2006 | Erickson et al. |
| 7,058,223 B2 | 6/2006 | Cox et al. |
| 7,181,398 B2 | 2/2007 | Thong et al. |
| 7,194,752 B1 | 3/2007 | Kenyon et al. |
| 7,266,645 B2 | 9/2007 | Garg et al. |
| 7,269,556 B2 | 9/2007 | Kiss et al. |
| 7,281,272 B1 | 10/2007 | Rubin et al. |
| 7,289,643 B2 | 10/2007 | Brunk et al. |
| 7,349,552 B2 | 3/2008 | Levy et al. |
| 7,363,278 B2 | 4/2008 | Schmelzer et al. |
| 7,426,750 B2 | 9/2008 | Cooper et al. |
| 7,443,797 B2 | 10/2008 | Cheung et al. |
| 7,474,759 B2 | 1/2009 | Sternberg et al. |
| 7,500,007 B2 | 3/2009 | Ikezoye et al. |
| 7,529,659 B2 | 5/2009 | Wold |
| 7,546,120 B1 | 6/2009 | Ulvenes et al. |
| 7,562,012 B1 | 7/2009 | Wold |
| 7,565,327 B2 | 7/2009 | Schmelzer |
| 7,593,576 B2 | 9/2009 | Meyer et al. |
| 7,653,210 B2 | 1/2010 | Rhoads |
| 7,701,941 B2 | 4/2010 | O'Callaghan et al. |
| 7,707,088 B2 | 4/2010 | Schmelzer et al. |
| 7,711,652 B2 | 5/2010 | Schmelzer et al. |
| 7,770,013 B2 | 8/2010 | Rhoads et al. |
| 7,797,249 B2 | 9/2010 | Schmelzer et al. |
| 7,853,664 B1 | 12/2010 | Wang et al. |
| 7,877,438 B2 | 1/2011 | Schrempp et al. |
| 7,917,645 B2 | 3/2011 | Ikezoye et al. |
| 8,006,314 B2 | 8/2011 | Wold |
| 8,082,150 B2 | 12/2011 | Wold |
| 8,086,445 B2 | 12/2011 | Wold |
| 8,112,818 B2 | 2/2012 | Wold |
| 8,130,746 B2 | 3/2012 | Schrempp et al. |
| 8,199,651 B1 | 6/2012 | Schrempp et al. |
| 8,316,238 B2 | 11/2012 | Mergen et al. |
| 8,332,326 B2 | 12/2012 | Schrempp et al. |
| 8,484,691 B2 | 7/2013 | Schmelzer et al. |
| 8,645,279 B2 | 2/2014 | Schmelzer |
| 8,732,858 B2 | 5/2014 | Wold |
| 8,775,317 B2 | 7/2014 | Schmelzer |
| 2001/0013061 A1 | 8/2001 | DeMartin |
| 2001/0027493 A1 | 10/2001 | Wallace |
| 2001/0027522 A1 | 10/2001 | Saito |
| 2001/0034219 A1 | 10/2001 | Hewitt et al. |
| 2001/0037304 A1 | 11/2001 | Paiz |
| 2001/0041989 A1 | 11/2001 | Vilcauskas et al. |
| 2001/0051996 A1 | 12/2001 | Cooper et al. |
| 2001/0056430 A1 | 12/2001 | Yankowski |
| 2002/0019858 A1 | 2/2002 | Kaiser |
| 2002/0023220 A1 | 2/2002 | Kaplan |
| 2002/0049760 A1 | 4/2002 | Scott |
| 2002/0064149 A1 | 5/2002 | Elliott et al. |
| 2002/0069098 A1 | 6/2002 | Schmidt |
| 2002/0073316 A1 | 6/2002 | Collins |
| 2002/0082999 A1 | 6/2002 | Lee |
| 2002/0083060 A1 | 6/2002 | Wang et al. |
| 2002/0087885 A1 | 7/2002 | Peled et al. |
| 2002/0120577 A1 | 8/2002 | Hans et al. |
| 2002/0123990 A1 | 9/2002 | Abe et al. |
| 2002/0129140 A1 | 9/2002 | Peled et al. |
| 2002/0133494 A1 | 9/2002 | Goedken |
| 2002/0133499 A1 | 9/2002 | Ward et al. |
| 2002/0141384 A1 | 10/2002 | Liu et al. |
| 2002/0152261 A1 | 10/2002 | Arkin et al. |
| 2002/0152262 A1 | 10/2002 | Arkin et al. |

(56) References Cited

U.S. PATENT DOCUMENTS

| | | |
|---|---|---|
| 2002/0156737 A1 | 10/2002 | Kahn |
| 2002/0157005 A1 | 10/2002 | Brunk et al. |
| 2002/0158737 A1 | 10/2002 | Yokoyama |
| 2002/0178410 A1 | 11/2002 | Haitsma et al. |
| 2002/0184517 A1 | 12/2002 | Tadayon et al. |
| 2002/0186887 A1 | 12/2002 | Rhoads |
| 2002/0198789 A1 | 12/2002 | Waldman |
| 2003/0014530 A1 | 1/2003 | Bodin |
| 2003/0018709 A1 | 1/2003 | Schrempp et al. |
| 2003/0023852 A1 | 1/2003 | Wold |
| 2003/0033321 A1 | 2/2003 | Schrempp et al. |
| 2003/0037010 A1 | 2/2003 | Schmelzer et al. |
| 2003/0051100 A1 | 3/2003 | Patel |
| 2003/0061352 A1 | 3/2003 | Bohrer |
| 2003/0061490 A1 | 3/2003 | Abajian |
| 2003/0095660 A1 | 5/2003 | Lee et al. |
| 2003/0105739 A1 | 6/2003 | Essafi et al. |
| 2003/0135623 A1 | 7/2003 | Schrempp et al. |
| 2003/0191719 A1 | 10/2003 | Ginter et al. |
| 2003/0191764 A1 | 10/2003 | Richards |
| 2003/0195852 A1 | 10/2003 | Campbell et al. |
| 2004/0008864 A1 | 1/2004 | Watson et al. |
| 2004/0010495 A1 | 1/2004 | Kramer et al. |
| 2004/0028281 A1 | 2/2004 | Cheng et al. |
| 2004/0053654 A1 | 3/2004 | Kokumai et al. |
| 2004/0073513 A1 | 4/2004 | Stefik et al. |
| 2004/0089142 A1 | 5/2004 | Georges et al. |
| 2004/0133797 A1 | 7/2004 | Arnold |
| 2004/0148191 A1 | 7/2004 | Hoke, Jr. |
| 2004/0163106 A1 | 8/2004 | Schrempp et al. |
| 2004/0167858 A1 | 8/2004 | Erickson |
| 2004/0199387 A1 | 10/2004 | Wang et al. |
| 2004/0201784 A9 | 10/2004 | Dagtas et al. |
| 2005/0021783 A1 | 1/2005 | Ishii |
| 2005/0038819 A1 | 2/2005 | Hicken et al. |
| 2005/0039000 A1 | 2/2005 | Erickson |
| 2005/0044189 A1 | 2/2005 | Ikezoye et al. |
| 2005/0097059 A1 | 5/2005 | Shuster |
| 2005/0141707 A1 | 6/2005 | Haitsma et al. |
| 2005/0154678 A1 | 7/2005 | Schmelzer |
| 2005/0154680 A1 | 7/2005 | Schmelzer |
| 2005/0154681 A1 | 7/2005 | Schmelzer |
| 2005/0216433 A1 | 9/2005 | Bland et al. |
| 2005/0267945 A1 | 12/2005 | Cohen et al. |
| 2005/0289065 A1 | 12/2005 | Weare |
| 2006/0034177 A1 | 2/2006 | Schrempp |
| 2006/0062426 A1 | 3/2006 | Levy et al. |
| 2007/0033409 A1 | 2/2007 | Brunk et al. |
| 2007/0074147 A1 | 3/2007 | Wold |
| 2007/0078769 A1 | 4/2007 | Way et al. |
| 2007/0186229 A1 | 8/2007 | Conklin et al. |
| 2007/0226365 A1 | 9/2007 | Hildreth et al. |
| 2007/0271248 A1 | 11/2007 | Albernoz et al. |
| 2008/0008173 A1 | 1/2008 | Kanevsky et al. |
| 2008/0019371 A1 | 1/2008 | Anschutz et al. |
| 2008/0133415 A1 | 6/2008 | Ginter et al. |
| 2008/0141379 A1 | 6/2008 | Schmelzer |
| 2008/0154730 A1 | 6/2008 | Schmelzer |
| 2008/0155116 A1 | 6/2008 | Schmelzer |
| 2008/0250080 A1* | 10/2008 | Arrasvuori et al. ........... 707/203 |
| 2009/0030651 A1 | 1/2009 | Wold |
| 2009/0031326 A1 | 1/2009 | Wold |
| 2009/0043870 A1 | 2/2009 | Ikezoye et al. |
| 2009/0077673 A1 | 3/2009 | Schmelzer |
| 2009/0089586 A1 | 4/2009 | Brunk |
| 2009/0131152 A1 | 5/2009 | Busse |
| 2009/0192640 A1 | 7/2009 | Wold |
| 2009/0240361 A1 | 9/2009 | Wold et al. |
| 2009/0306966 A1* | 12/2009 | Hejna, Jr. .......................... 704/9 |
| 2009/0328236 A1 | 12/2009 | Schmelzer |
| 2010/0042843 A1 | 2/2010 | Brunk |
| 2010/0104259 A1 | 4/2010 | Shakya et al. |
| 2010/0281042 A1 | 11/2010 | Windes et al. |
| 2010/0290867 A1 | 11/2010 | Nice et al. |
| 2011/0066489 A1 | 3/2011 | Gharaat et al. |
| 2011/0078719 A1 | 3/2011 | Kenyon et al. |
| 2011/0119149 A1 | 5/2011 | Ikezoye et al. |
| 2012/0124679 A1 | 5/2012 | Wold |
| 2013/0011008 A1 | 1/2013 | Ikezoye et al. |

FOREIGN PATENT DOCUMENTS

| | | |
|---|---|---|
| EP | 0517405 | 5/1992 |
| EP | 0689316 | 12/1995 |
| EP | 0731446 | 9/1996 |
| EP | 0859503 | 8/1998 |
| EP | 0459046 | 4/1999 |
| EP | 1354276 | 12/2007 |
| EP | 1485815 | 10/2009 |
| EP | 177191 | 2/2012 |
| EP | 1449103 | 3/2012 |
| GB | 2464049 | 12/2012 |
| WO | WO 96/36163 | 11/1996 |
| WO | WO 98/20672 | 5/1998 |
| WO | WO 00/05650 | 2/2000 |
| WO | WO 00/39954 | 7/2000 |
| WO | WO 00/63800 | 10/2000 |
| WO | WO 01/23981 | 4/2001 |
| WO | WO 01/47179 | 6/2001 |
| WO | WO 01/52540 | 7/2001 |
| WO | WO 01/62004 | 8/2001 |
| WO | WO 02/03203 | 1/2002 |
| WO | WO 02/15035 | 2/2002 |
| WO | WO 02/27600 | 4/2002 |
| WO | WO 02/37316 | 5/2002 |
| WO | WO 02/082271 | 10/2002 |
| WO | WO 03/009149 | 1/2003 |
| WO | WO 03/036496 | 5/2003 |
| WO | WO 03/067459 | 8/2003 |
| WO | WO 03/091990 | 11/2003 |
| WO | WO 2004/044820 | 5/2004 |
| WO | WO 03/007235 | 7/2004 |
| WO | WO 2004/070558 | 8/2004 |
| WO | WO 2006/015168 | 2/2006 |
| WO | WO 2009/017710 | 2/2009 |

OTHER PUBLICATIONS

Albert, Douglas, et al., "Combatting Software Piracy by encryption and key management," IEEE Computer Society, vol. 17. No. 4, Apr. 1984, 6 pages.

Audible Magic Corporation, "Audio Identification Technology Provides the Cornerstone for Online Distribution," 2000, http://www.audiblemagic.com/documents/Technology_Summary.pdf.

Baum, L., et al., "A Maximization Technique Occurring in the Statistical Analysis of Probabilistic Functions of Markov Chains," *The Annals of Mathematical Statistics*, vol. 41, No. 1, pp. 164-171, 1970.

Beritelli, F., et al., "Multilayer Chaotic Encryption for Secure Communications in packet switching Networks," IEEE, vol. 2 Aug. 2000, pp. 1575-82.

Blum, T., Keislar, D., Wheaton, J., and Wold, E., "Audio Databases with Content-Based Retrieval," Proceedings of the 1995 International Joint Conference on Artificial Intelligence (IJCAI) Workshop on Intelligent Multimedia Information Retrieval, 1995.

Breslin, Pat, et al., Relatable Website, "Emusic uses Relatable's open source audio recognition solution, TRM, to signature its music catablog for MusicBrainz database," http://www.relatable.com/news/pressrelease/001017.release.html, Oct. 17, 2000.

Business Wire, "Cisco and Fox Host Groundbreaking Screening of Titan A.E.; Animated Epic Will Be First Film Ever to be Digitaly Transmitted Over the Internet Monday," Jun. 5, 2000, 08:14 EDT.

Business Wire, "IBM: IBM Announces New Descrambler Software; First to Offer Software to Work With Digital Video Chips," Jun. 5, 25, 1997, 07:49.

Chen, et al., Yong-Cong, A Secure and Robust Digital Watermaking Technique by the Blcok Cipher RC6 and Secure Hash Algorithm, Department of Computer Science, National Tsing Hua University, 2001.

Cosi, P., De Poli, G., Prandoni, P., "Timbre Characterization with Mel-Cepstrum and Neural Nets," Proceedings of the 1994 International Computer Music Conference, pp. 42-45, San Francisco, No date.

(56) References Cited

OTHER PUBLICATIONS

Dempster, A.P., et al., "Maximum Likelihood from Incomplete Data via the EM Algorithm" *Journal of the Royal Statistical Society, Series B (Methodological)*, vol. 39, Issue 1, pp. 31-38, 1977.

Feiten, B. and Gunzel, S., "Automatic Indexing of a Sound Database Using Self-Organizing Neural Nets," Computer Music Journal, 18:3, pp. 53-65, Fall 1994.

Fischer, S., Lienhart, R., and Effelsberg, W., "Automatic Recognition of Film Genres," Reihe Informatik, Jun. 1995, Universitat Mannheim, Praktische Informatik IV, L15, 16, D-68131 Mannheim.

Foote, J., "A Similarity Measure for Automatic Audio Classification," Institute of Systems Science, National University of Singapore, 1977, Singapore.

Haitsma, J., et al., "Robust Audio Hashing for Content Identification", CBMI 2001, Second International Workshop on Content Based Multimedia and Indexing, Brescia, Italy, Sep. 19-21, 2001.

Harris, Lesley Ellen, "To register or not," Mar. 2006, Information Outlook, 10, 3, 32(s).

Kanth, K.V. et al. "Dimensionality Reduction or Similarity Searching in Databases," Computer Vision and Image understanding, vol. 75, Nos. 1/2 Jul./Aug. 1999, pp. 59-72, Academic Press. Santa Barbara, CA, USA.

Keislar, D., Blum, T., Wheaton, J., and Wold, E., "Audio Analysis for Content-Based Retrieval" Proceedings of the 1995 International Computer Music Conference.

Lin, et al., "Generating Robust Digital Signature for Image/Video Authentication," Proc. Multimedia and Security workshop at ACM Multimedia'98, Sep. 1, 1998, pp. 49-54.

Ohtsuki, K., et al., "Topic extraction based on continuous speech recognition in broadcast-news speech," Proceedings IEEE Workshop on Automated Speech Recognition and Understanding, 1997, pp. 527-534, N.Y., N.Y., USA.

PacketHound Tech Specs, www.palisdesys.com/products/packethount/tck specs/prodPhtechspecs.shtml, 2002.

"How does PacketHound work?" www.palisdesys.com/products/packethound/how_does_it_work/prod_Pghhow.shtml 2002.

Pankanti, Sharath, "Verification Watermarks on Fingerprint Recognition and Retrieval," Part of IS&T/SPIE Conference on Security and Watermarking of Multimedia Contents, San Jose, CA Jan. 1999, SPIE vol. 3657, pp. 66-78.

Pellom, B. et al., "Fast Likelihood Computation Techniques in Nearest-Neighbor search for Continuous Speech Recognition.", *IEEE Signal Processing Letters*, vol. 8, pp. 221-224 Aug. 2001.

Reynolds, D., et al., "Robust Text-Independent Speaker Identification Using Gaussian Mixture Speaker Models", *IEEE Transactions on Speech and Audio Processing*, vol. 3, No. 1, pp. 72-83 Jan. 1995.

Scheirer, E., Slaney, M., "Construction and Evaluation of a Robust Multifeature Speech/Music Discriminator," pp. 1-4, Proceedings of ICASSP-97, Apr. 2-24, Munich, Germany.

Scheirer, E.D., "Tempo and Beat Analysis of Acoustic Musical Signals," Machine Listening Group, E15-401D MIT Media Laboratory, pp. 1-21, Aug. 8, 1997, Cambridge, MA.

Schneier, Bruce, Applied Cryptography, Protocols, Algorithms and Source Code in C, Chapter 2 Protocol Building Blocks, 1996, pp. 30-31.

Smith, Alan J., "Cache Memories," Computer Surveys, Sep. 1982, University of California, Berkeley, California, vol. 14, No. 3, pp. 1-61.

Vertegaal, R. and Bonis, E., "ISEE: An Intuitive Sound Editing Environment," Computer Music Journal, 18:2, pp. 21-22, Summer 1994.

Wang, Yao, et al., "Multimedia Content Analysis," IEEE Signal Processing Magazine, pp. 12-36, Nov. 2000, IEEE Service Center, Piscataway, N.J., USA.

Wold, Erling, et al., "Content Based Classification, Search and Retrieval of Audio," IEEE Multimedia, vol. 3, No. 3, pp. 27-36, 1996 IEEE Service Center, Piscataway, N.J., USA.

Zawodny, Jeremy, D., "A C Program to Compute CDDB discids on Linus and FreeBSD," [internet] http://jeremy.zawodny.com/c/discid-linux-1.3tar.gz, 1 page, Apr. 14, 2001, retrieved Jul. 17, 2007.

European Patent Application No. 02752347.1, Supplementary European Search Report Dated May 8, 2006, 4 pages.

European Patent Application No. 02756525.8, Supplementary European Search Report Dated Jun. 28, 2006, 4 pages.

European Patent Application No. 02782170, Supplementary European Search Report Dated Feb. 7, 2007, 4 pages.

European Patent Application No. 02725522.3, Supplementary European Search Report Dated May 12, 2006, 2 Pages.

European Patent Application No. 04706547.9 European Search Report Dated Feb. 25, 2010, 3 Pages.

European Patent Application No. 05778109.8 European Search Report Dated Sep. 10, 2010, 7 Pages.

PCT Search Report PCT/US01/50295, International Search Report dated May 14, 2003, 5 Pages.

PCT Search Report PCT/US02/10615, International Search Report dated Aug. 7, 2002, 5 Pages.

PCT Search Report PCT/US02/33186, International Search Report dated Dec. 16, 2002, 6 Pages.

PCT Search Report PCT/US04/02748, International Search Report and Written Opinion dated Aug. 20, 2007, 8 Pages.

PCT Search Report PCT/US05/26887, International Search Report dated May 3, 2006, 3 Pages.

PCT Search Report PCT/US08/09127, International Search Report dated Oct. 30, 2008, 8 Pages.

International Search Report & Written Opinion dated Apr. 15, 2014, for PCT/US2013/061750.

\* cited by examiner

USING DIGITAL FINGERPRINTS TO ASSOCIATE DATA WITH A WORK

BACKGROUND OF THE INVENTION

Individuals often want to create annotations attached to points or segments in a work (for example, a video, a music recording, or the like) that can then be shared and used by others, or that they can access themselves when the work is replayed at a later time or different location. Standard methods of associating data with a work at a particular point in the work rely on using time offsets into the work such that there is an inherent risk in presenting the associated data too early or too late, thus diminishing a user experience.

BRIEF DESCRIPTION OF THE DRAWINGS

The embodiments described herein will be understood more fully from the detailed description given below and from the accompanying drawings, which, however, should not be taken to limit the application to the specific embodiments, but are for explanation and understanding only.

DETAILED DESCRIPTION OF THE PRESENT INVENTION

Figure 1:
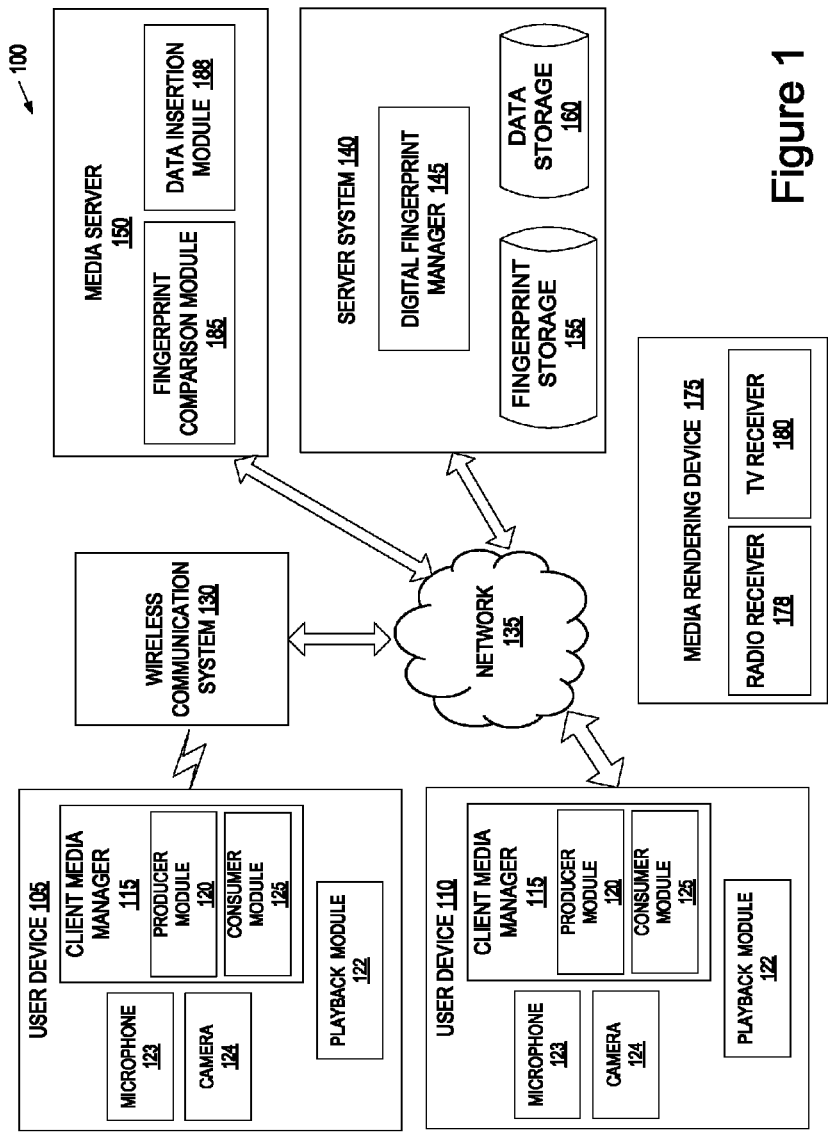
FIG. 1 is a block diagram of an exemplary network architecture, in accordance with one embodiment of the present invention.

Methods and systems for enabling a user device to receive user-entered data (or other user originated data) and associate that data with a fingerprint of a segment for a work are described. Methods and systems for enabling a user device or server to transmit data associated with a fingerprint for playback are also described. The user device may be any content rendering device that includes a modem or network interface for connecting the user device to a network. Examples of such user devices include cellular telephones, personal digital assistants (PDAs), portable media players, installed media players, tablet computers, laptop computers, netbooks, televisions, smart TVs (televisions with integrated internet capabilities) cable and satellite television set-top boxes, smart glasses, smart clothing, smart watches, smart appliances, and the like.

In one embodiment, a user device plays a work and receives data to be associated with a particular point in the work. Alternatively, the user device may use a microphone and/or camera to sample a work from a surrounding environment (e.g., to sample a performance of a work or a work being rendered by another device). The user device may receive data to be associated with a particular point of the sampled work. A work may be anything that is fixed in a tangible medium. Some examples of works include, but are not limited to, audio renderings, video renderings, images and video/audio renderings. An example of an audio rendering is a song or other audio track. Examples of video renderings include animation or video sequence. Examples of an image include photographs and paintings. Examples of audio/video renderings include movies, television shows, cartoons, and any audio/video combination that is fixed using MPEG, AVI, VHS or any of the analog or digital encoding technologies as are commonly known. A single work may be rendered in many different ways in a tangible medium. For example, one fixed audio segment may be fixed on an analog tape, in an MP3 audio stream, and as part of a soundtrack in an audio/video rendering, and so forth. It will be obvious to anyone fluent in the art that embodiments of the present invention can apply to one entire work and to segments of a work. It will also be obvious that one work may contain segments of another work. Note that in some embodiments (e.g., in the case of sampling a live performance), the work being sampled may not initially be embodied in a tangible medium.

The user device may generate a user digital fingerprint of a segment of the work at the particular point in the work and associate the data to the fingerprint. As used herein, a user digital fingerprint may be a fingerprint of a work generated by a user device. The data and user digital fingerprint may be sent to a server to be saved for use during a later playback of the work. In one embodiment, the data and user fingerprint together form a tag. The server may replace the user digital fingerprint in the tag with a master digital fingerprint. As used herein, a master digital fingerprint may be a fingerprint of a high quality version of the known work. A second user device may receive the digital fingerprint and data at some point in time. The second user device may use the associated user fingerprint or master fingerprint to determine the point in the playback of the work that corresponds to the point that has data associated with it. The second user device may present the associated data to the user of the second user device. For example, a first user may use a mobile phone to play a video and enter text commentary at particular points in the video. A second user device, while playing back the same work, may identify the particular point in the video using the digital fingerprint, and may present the commentary entered by the first user at the particular point in the video.

In another embodiment a first device may be rendering a media stream. A second device may capture samples of the rendering by means of a microphone or camera on the second device. Data may be input by a user, and may be associated with a user fingerprint created from the captured samples of the media stream. For example the first device may be rendering a DVD or radio program. The second device may be sampling this media stream by way of a camera or microphone. The second device generates a user digital fingerprint of an immediate portion of the media stream being samples and associates the data with the user digital fingerprint for later use. In this example, the term immediate portion may mean a portion of the captured samples of the media stream (which may occur as much as two minutes before or two minutes after the point in the media stream where the data should be associated).

In another embodiment, both actions may occur on the same device instead of separate devices. A user device may play a work and receive data to be associated with a particular point in the work. The user device generates a user digital fingerprint of the work, or portion thereof, and associates the data to the user fingerprint. The data and user fingerprint (or master fingerprint) may be saved locally on the user device for use during a later playback of the work. During later playback of the work on the same device (which may be a same rendition of the work or a different rendition of the work), the user device may determine the point in the work that has associated data and present it to the user. For example, a user may download a video to a tablet computer, play it on the tablet computer, and enter text commentary at particular points in the video. The same tablet computer while playing back the video, may present the commentary entered by the first user at the particular point in the video.

In another embodiment the data associated with a point in the work using the fingerprint may instruct the client device to take some action. By means of example and not limitation, some actions include—communicating with another application on the device, such as a to-do list application; communicating with another server, such as one that would provide a purchase recommendation to the user; communicating with another server, such as one that would log the exposure of the device to the work at the point of the fingerprint; communicating with another device to cause it to behave in some way, such as vibrate, rotate, elevate, release a scent, change color, change temperature, emit sounds, and/or display some information; and so forth.

In another embodiment the user device may generate a user fingerprint from a media stream. The user device may use this fingerprint to identify the work being played. The user device may then download a master fingerprint of a known work which corresponds to the work being played. The user device then associates data with the master fingerprint of the known work. Note that in an alternative embodiment, the user device may extract a portion of the master fingerprint and associate the data with the extracted portion of the master fingerprint. For example, the master fingerprint may be a fingerprint of multiple segments. The user device may extract a portion of the master fingerprint that is associated with a particular segment or set of segments.

FIG. 1 is a block diagram of an exemplary network architecture 100 in which embodiments described herein may operate. The network architecture 100 may include a server system 140, a media server 150, and one or more user devices 105-110 capable of communicating with the server system 140 and/or the media server 150 via a network 135 (e.g., a public network such as the Internet or a private network such as a local area network (LAN)) and/or a wireless communication system 130. In one embodiment, a user device 105 connects to server system 140 and/or media server 150 via the wireless communications system 130 and network 135. In another embodiment a user device 110 connects to server system 140 and/or media server 150 via network 135. In another embodiment user device 105 is not connected to a network and performs the described functions in isolation.

The user devices 105-110 may be variously configured with different functionality to enable consumption of one or more types of media items and/or sampling of works from an environment in which the user devices 105-110 are placed. The media items may be any type of format of digital content, including, for example, digital audio (e.g., music, audible books, etc.), digital video (e.g., movies, television, short clips, etc.), and multi-media content. Each media item may include a specific work. The user devices 105-110 may include any type of content rendering devices such as mobile phones, laptop computers, portable media players, tablet computers, cameras, video cameras, netbooks, notebooks, desktop computers, televisions, cable and satellite television set-top boxes, audio or image sensing eyewear, and the like. In one embodiment, the user devices 105-110 are mobile devices. The user devices 105-110 may store content locally on storage media or in memory for later playback. Additionally, media server 150 may deliver media to the user devices 105-110, such as during streaming of music or videos to the user devices 105-110.

In one embodiment, user devices 105-110 may include a microphone 123 and/or a camera 124, which may be integrated into the device or attached externally. Microphone 123 may be used to sample audio of a surrounding environment of user devices 105-110. Similarly, Camera 124 may be used to sample audio, video, or images of a surrounding environment of the user device 105-110. For example, if a nearby media rendering device 175 (e.g., a radio having a radio receiver 178 or a television (TV) having a TV receiver 180, or a DVD player) is playing a work, the microphone may pick up segments of the work being played by the media rendering device 175.

In one embodiment, one or more of the user devices 105-110 include a client media manager 115. The client media manager 115 may manage the processing of media items on the user devices 105-110, the provisioning of sampled audio and/or video data that includes segments of works, as well as the generation of digital fingerprints of the work (or works) included in the media items. For example, the client media manager 115 may manage the generation of user digital fingerprints of audio, video, or images captured by user devices 105-100 via microphone 123 or camera 124 from the surrounding environment. The client media manager 115 may also manage the generation of user digital fingerprints directly from the media being rendered by playback module 122. The client media manager 115 may also manage the receipt of data, association of the data with the user digital fingerprints (e.g., to generate a tag), sending and receiving information (e.g., tags) to and from server system 140, and the presentation of data during playback of a work. The client media manager 115 may be comprised of a producer module 120 and a consumer module 125.

The producer module 120 may handle processing involved in the management of the data to be associated with a work played on or sampled by the user devices 105-110. In one embodiment, producer module 120 monitors playback of a work (e.g., a work included in a media item played on the user device or a work sampled from an environment by the user device), and generates user digital fingerprints of the work locally on the user devices 105-110. In one embodiment, a playback module 122 on the same user device 105-110 as the client media manager 115 plays the work that is fingerprinted. Alternatively, the user device 105-110 may not include a playback module 122, and may rely on sampling of a work from an environment of the user device 105-110. The work may be in streamed media being played by a player on the user device, such as a streamed movie or song being provided by a media server. The work may also be in a stored media item that is being played on the user device, such as playback of a digital video disk (DVD), stored movie file, stored audio file, and so forth. The work may also be a broadcast of the work that is received by a tuner on the user device. For example, the work may be a radio broadcast, a television broadcast, and so forth. The work may also be sampled from an environment of the user device. For example, the work may be rendered from any source by another device, the rendering of which is then sensed by the user device.

In one embodiment, digital fingerprints are generated continuously during playback. Alternatively, a cache of recently played segments of a work may be maintained, and fingerprints may be generated from such cached segments, present segments, and/or subsequent segments responsive to a user command to add data to the work at a particular point in the work. Producer module 120 receives a command to associate data with the work at a particular point in the work to be presented at the same point during playback of the work at a later time. For example, the data may be text commentary, a digital image, a uniform resource locator (URL), a video, a sound effect or a command.

Producer module 120 associates the received data with the user digital fingerprint that corresponds to the segment of the work at the particular point in the work and saves it for later use. In one embodiment, producer module 120 generates a tag that includes the user digital fingerprint and the data. A segment of a work may be less than an entirety of the work and may include at least one of audio or video or image media content. In one embodiment, a segment is a clip (e.g., a sequence of frames) of the work. For example, a segment may be between a single frame and a 10 second clip of a video or song. For example, a segment may be between 5% and 100% of an image. For example, a segment may contain the entire visual image and some irrelevant other data around the image, as when one takes a video of a television screen but the television screen does not consume the entire image space. In one embodiment, the data and associated user digital fingerprint are saved locally on user devices 105-110 for later use on the same user device. In another embodiment, the data and associated user digital fingerprint are transmitted to server system 140 to be saved in data storage 160 and fingerprint storage 155 for later use on the same or other user devices. The server system 140 may additionally replace the user digital fingerprint with a higher quality master digital fingerprint (or a portion of a higher quality master digital fingerprint). Such replacement may be particularly useful when the user fingerprint was generated from a segment of a work sampled from a microphone or camera.

The consumer module 125 may handle processing involved in presenting the data on the same or different user devices 105-110 during later playback of the same work. Said playback may occur on the same user device 105-110. Alternatively said playback rendering may occur on some other device and be sampled by microphone 123 or camera 124. During playback, consumer module 125 may generate fingerprints of segments of the work and compare the digital fingerprint of the segment of the work being played back to the user digital fingerprints or master fingerprints stored locally on the user devices 105-110. Alternatively, consumer module 125 may generate fingerprints and send these fingerprints to server system 140 for comparison to user fingerprints or master fingerprints. In such an embodiment, the server system may respond with data associated with a master fingerprint or user fingerprint matching the fingerprint that was sent to the server system. In one embodiment, segments may overlap. For example, a first segment may include seconds 1-5 in a video, a second segment may include seconds 2-6, a third segment may include seconds 3-7, and so on. Accordingly, consumer module 125 may generate a continuous stream of fingerprints from overlapping segments during playback. In one embodiment, fingerprints of segments are generated before those segments are played. This enables a match to be made to the stored fingerprint associated with the data before the segment associated with the data is played. Note that a match may be an approximate match. In one embodiment, two fingerprints are determined to match if they differ by less than a threshold amount (e.g., 10%, 20%, etc.).

Note that playback of the work may begin before the user device 105-110 has received any data or associated master fingerprints (or user fingerprints). In such an embodiment, consumer module 125 may query server system 140 for data and associated fingerprints after playback of the work by playback module 122 has begun, or before the rendering device 175 has begun rendering the work.

When consumer module 125 encounters a match between a generated digital fingerprint and a saved digital fingerprint that is associated with data, the data will be used. One use of the data is that it be presented to the user on the user devices 105-110. Another use is that the data be presented on another device such as a TV display or radio. Additionally, other actions may be performed, such as communicating with another device or server, communicating with another application on the user device, loading a web page, posting data to a blog or social media site, and so forth. One can imagine a user device posting to a user's Facebook page a message that the user has just watched some particular part of a movie or television show.

In one embodiment, a playback time range is associated with the digital fingerprint. The playback time range may indicate a point during playback at which digital fingerprints shall be generated for comparison to the saved fingerprint. This may save processing power by minimizing the number of fingerprints that are generated during playback. The playback time range may include a time in the work associated with the segment used to generate the fingerprint associated with the data plus or minus an error factor (e.g., 10 minutes). The error factor may account for changes that are made to the work (e.g., cutting the play time of the work to add commercials, changing a starting time of the work, and so forth).

In another embodiment, consumer module 125 may send a request to server 140 to subscribe to any data saved on the server system 140 that is entered by a particular user on any user device or any data saved for a particular work. During playback of a work, consumer module 125 may generate a digital fingerprint of the segment of the work being played back and send a request to server system 140 to determine whether there is any saved data associated with a master fingerprint or user fingerprint that matches the fingerprint generated on the user device. If server system 140 finds any saved data associated with a matching master or user fingerprint, it may then send that saved data to consumer module 125. When consumer module 125 encounters the particular point in the work where the fingerprint matches that of the master or user fingerprint associated with the data, the data will be used in any of the ways previously described.

Alternatively, consumer module 125 may send a request to server system 140 to receive all fingerprints with associated data for a particular work that have been generated by one or more entities to which the user subscribes. Server system 140 may then send the fingerprints and the associated data to the user device. Consumer module 125 may match the fingerprints with the generated fingerprints during playback and when the particular points in the work are encountered, use the associated data as appropriate.

In one embodiment, the data may be presented by displaying text associated with the particular point in the work. Additionally, the user devices 105-110 may display a digital image, launch a web browser to display a URL, play a video clip or sound effect, or execute a command on the user devices 105-110. Other types of data may also be associated with the fingerprint to perform other actions.

User devices 105-110 may connect to the server system 140 via a wireless communication system 130. The wireless communication system 130 may provide a wireless infrastructure that allows users to use the user devices 105-110 to consume items provided by the server system 140 without being tethered via hardwired links. The wireless communications systems 130 may be wireless fidelity (WiFi) hotspots connected with the network 135. The wireless communication systems 130 may alternatively be a wireless carrier system (e.g., as provided by Verizon®, AT&T®, T-Mobile®, etc.) that can be implemented using various data processing equipment, communication towers, etc.

The server system 140 may include one or more machines (e.g., one or more server computer systems, routers, gateways, etc.). In one embodiment, the server system 140 includes one or more cloud based servers (such as server systems made accessible to network connectivity via the internet or wireless carrier systems), which may be hosted, for example, by cloud based hosting services such as Amazon's® Elastic Compute Cloud® (EC2).

The server system 140 may have greater resources than the user devices 105-110. Accordingly, the server system 140 may implement resource intensive algorithms for matching the fingerprint of the work during playback to fingerprints associated with data for presentation on the user devices 105-110. Thus, in some instances improved throughput and/or improved fingerprint matching may be achieved by having the server system 140 perform fingerprint matching for the user devices 105-110.

In one embodiment, server system 140 may include a digital fingerprint manager 145, a fingerprint storage 155, and a data storage 160. Digital fingerprint manager 145 is configured to match user digital fingerprints generated by user devices 105-110 to master digital fingerprints of known works stored and to previously generated user digital fingerprints stored on the server system 140 in fingerprint storage 155. Additionally, digital fingerprint manager 145 manages the receipt, storage, and distribution of data associated with master digital fingerprints of known works and data associated with user digital fingerprints. Data received by digital fingerprint manager 145 is stored in data storage 160 for later distribution. Alternatively, master and/or user digital fingerprints and data may be stored together in a single file, or may be stored in a relational database. Further, digital fingerprint manager 145 processes subscription requests from user devices 105-110, utilizing fingerprint storage 155 and data storage 160.

For example, producer module 120 on user devices 105-110 may create a user fingerprint and associated data combination, then send the combination to server system 140 via network 135. Digital fingerprint manager 145 on server 140 will receive the user fingerprint and data combination, and compare the user fingerprint generated by the user device to the master fingerprints stored in fingerprint storage 155. Once a corresponding master fingerprint is located in fingerprint storage 155, digital fingerprint manager 145 may store the data in data storage 160 and associate that data with the master fingerprint of the known work stored in fingerprint storage 155. Thus, the data may be stored on the server system 140 such that it is associated with a high quality master digital fingerprint of the work. This may improve an ability to match future user fingerprints generated from the segments of a low quality of a work being sampled to the digital fingerprint associated with the data.

In one embodiment, if no match to a master fingerprint can be made, then digital fingerprint manager 145 may store the data in data storage 160, store the user digital fingerprint in fingerprint storage 155, and associate the two. Thus, it is possible that some elements of data in data storage 160 are only associated with user fingerprints and not with any master fingerprint. Alternatively, even if a match is made between a user fingerprint and a master fingerprint, the digital fingerprint manager 145 may choose to store the user digital fingerprint in fingerprint storage 155 and associate the data with both fingerprints. Thus, the digital fingerprint manager 145 may have several fingerprints associated with data. This multiplicity of fingerprints may be useful to improve the ability to match future user fingerprints.

In another embodiment, consumer module 125 on user devices 105-110 sends a subscription request for a media work that is saved on server system 140. The work may be downloaded and stored locally on user devices 105-110 or it may be streamed to the user devices 105-110 via media server 150, or it may be streamed to an ancillary media rendering device and captured via microphone 123 or camera 124. For works stored locally on user devices, digital fingerprint manager 145 may transmit some or all digital fingerprints of the work stored in fingerprint storage 155 along with associated data from data storage 160 to the user device so the user device can manage playback and presentation of the data locally.

For works streamed via media server 150, digital fingerprint manager 145 may transmit the fingerprints and associated data to media server 150 so that it may embed these in the media stream such that the user device need not compare locally generated digital fingerprints to those on the server. In this embodiment, media server 150 streams the work with the associated data already integrated at the appropriate place in the work. In one embodiment, media server 150 includes a fingerprint comparison module 185 and a data insertion module 188. The fingerprint comparison module 185 may generate fingerprints of a work being streamed, and may compare those fingerprints to a fingerprint received with associated data from server system 140. Once a match is identified, data insertion module 188 may insert the data into the work at a position in the work indicated by the matching fingerprints. Thus, media server 150 may stream both the data and the work to the user device 105, 110. Then the user device would not need to perform any fingerprint generation or comparison. The user device may simply act on the data when it is encountered in the stream.

In another embodiment the digital fingerprint manager 145 may transmit a master digital fingerprint of a known work from fingerprint storage 155 to the user devices where producer module 120 will make the comparison between the producer generated fingerprint and the master fingerprint of the known work. When the producer module 120 is instructed to create a tag it may associate the data for the tag with a master fingerprint taken from a portion of the fingerprint of the known work.

Figure 2A:
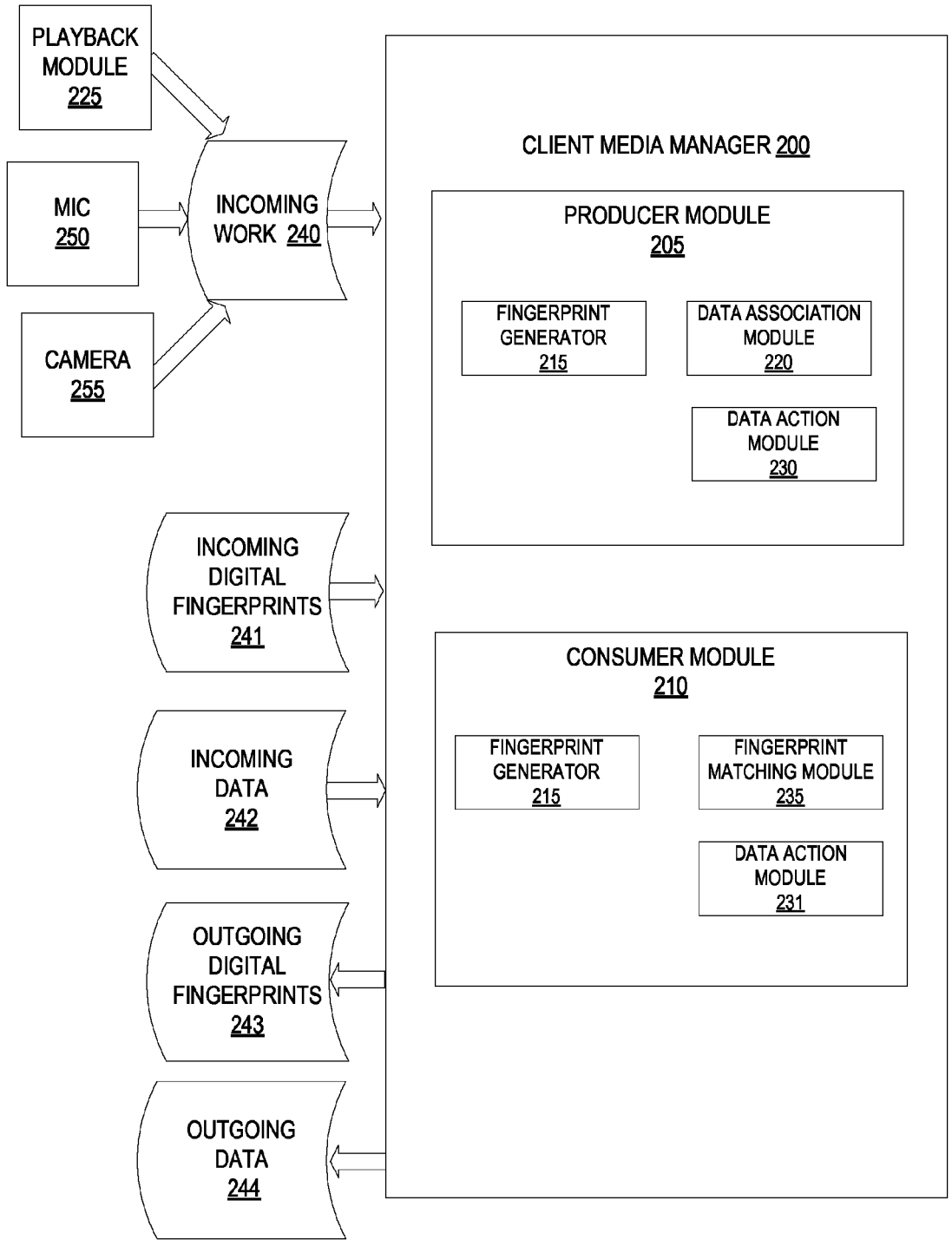
FIG. 2A is a block diagram of one embodiment of a client media manager.

FIG. 2A is a block diagram of one embodiment of a client media manager 200, which may correspond to the client media manager 115 of FIG. 1. The client media manager 200 may include one or more of a producer module 205 and a consumer module 210. Additionally, client media manager 200 may receive an incoming media work 240, incoming digital fingerprints 241 and incoming data 242, as well as transmit outgoing digital fingerprints 243 and outgoing data 244. The incoming work 240 may be from digital stream, a playback module 225, a microphone capture 250, a camera 255, or other sensor capable of fixing the work in a digital form. The incoming work 240 may be a sampling of a work being played on a separate device.

Producer module 205 is configured to enable a user device to associate data to a segment of a work at a particular point in the work. In one embodiment, producer module 205 includes a fingerprint generator 215, a data association module 220 and a data action module 230. In one embodiment, producer module 205 may correspond to the producer module 120 of FIG. 1.

Fingerprint generator 215 is configured to generate a digital fingerprint from a segment of a work, such as audio and/or video content. In one embodiment, fingerprint generator 215 may receive the audio and/or video content via incoming work 240. Fingerprint generator 215 may create the digital fingerprint using conventional digital signal processing known in the art. For example, a digital fingerprint of a sound stream may be generated according to acoustic and/or perceptual features over time. In one embodiment, digital fingerprints may be generated from the media content of a work according to a predetermined or user-defined interval. In another embodiment, a digital fingerprint may be generated when a user attempts to associate data with a segment of a work at a particular point in the work.

In one embodiment, digital fingerprints are generated by generating a feature vector of a segment of the work. The feature vector may be generated from an audio portion of the work, an image portion of the work, or both. For example, in one embodiment, fingerprint generator 215 measures a variety of acoustical features of a segment. The acoustical features may include loudness, pitch, bass, brightness, bandwidth, Mel-frequency cepstral coefficients (MFCCs), and so forth. Fingerprint generator 215 may also compute first and/or second derivatives of some or all of these features to determine changes in the features and rates of changes in the features. Fingerprint generator 215 may compute statistical measurements such as mean and standard deviations of each of these features over the segment as well. Some or all of these values may be included in the feature vector. For example, in one embodiment, fingerprint generator 215 measures a variety of visual features of a frame. The visual features may include luminosity, pixel colors, shading, etc. For example in one embodiment, fingerprint generator 215 measures the variation in visual features over the segment of the work. The time varying features may include the motion of pixels or pixel regions, the change in luminosity, the gross difference in pixel regions, and so forth.

An optional playback module 225 configured to render a work on the user device or otherwise play the work. In one embodiment, an audio file, video file, video stream, audio stream, etc. may be played by playback module 225. Playback module 225 may provide played (or to be played) segments of the work to client media manager 200. Alternatively, a microphone 250 and/or camera 255 may capture segments of a work from a surrounding environment, and may provide these segments of the work to client media manager 200.

Data association module 220 is configured to associate data with a segment of a work at a particular point in the work. In one embodiment, data association module 220 may be invoked by producer module 205 when a user issues a command to associate data with a work being played or sampled. For example, a user may watch a video and issue a command to enter text commentary at a particular point in the video. In another embodiment, data association module 220 may be invoked by producer module 205 when a user issues a command to associate data with a work being captured by a microphone 250. Data association module 220 may receive the user-entered data via a keyboard and associate the data with that point in the video. In one embodiment this data may be user generated commentary. In one embodiment, this association may be accomplished by utilizing the user fingerprint generated by fingerprint generator 215 for that segment of the work. In one embodiment data association module 220 matches the user fingerprint from fingerprint generator 215 to a master fingerprint (or a portion of a master fingerprint) of a known work 241 and associates the data with the master fingerprint (or portion thereof) of the known work. Data association module 220 may save the data and associated fingerprint locally on the user device, either combined or separately in a file or database. Alternatively, the data and digital fingerprint may be sent to a server system via outgoing data 244 and outgoing digital fingerprints 243 respectively.

Data action module 230 may be configured to display data entered by a user during the process of associating that data with a work. In one embodiment, if a user issues a command to associate text commentary to a video, data action module 230 may present a window on the screen of the user device to allow the user to observe the text being entered. In an alternative embodiment, if a user issues a command to associate a sound file to a work, data action module 230 may present a graphical representation of a recording device to permit the user to start and stop the sound file recording. Thus, a user may review how generated data will be presented along with the work. In another embodiment, the user may perform a new work that is captured via a microphone or camera or both, and this new work may become the data associated with the user fingerprint.

Consumer module 210 is configured to enable a user device to receive and display data associated with segments of a work at particular points in the work. Consumer module 210 may also perform other actions at particular points in the work based on the data. In one embodiment, consumer module 210 includes a fingerprint generator 215, a fingerprint matching module 235, and a data action module 230. In one embodiment, consumer module 210 may correspond to the consumer module 125 of FIG. 1.

Fingerprint generator 215 is configured to generate a user digital fingerprint from a segment of a work, as described above. In one embodiment, fingerprint generator 215 may also generate user digital fingerprints during playback of a work in order to determine if and when associated data is to be presented to the user (or other actions are to be performed). For example, if a user plays a video after having subscribed to data and fingerprints entered by an entity for that particular video, fingerprint generator 215 may generate digital user fingerprints for the video during playback that will be used to compare to tag fingerprints (fingerprints associated with or included in a tag) to determine the particular point in the video to present the data. In one embodiment, the entity may be a user who enters data associated with a media work. For example, a user may associate text commentary data with particular points in a video work. In another embodiment, the entity may be an automated transcription service that associated data with a media work from a data store. For example, an automated service may add statistical information at particular points in a broadcast of an athletic event, such as historical batting averages of baseball players during the broadcast of a baseball game. Another example is an automated object recognition system associating data about a recognized object, such as a particular automobile, actor, location, or product, to particular points in the work.

Fingerprint matching module 235 is configured to match digital fingerprints of a work with stored user or master fingerprints associated with data in order to determine points in the work to present the data. In one embodiment, fingerprint matching module 235 receives digital fingerprints generated by fingerprint generator 215 in consumer module 210 from incoming work 240. In one embodiment, a user device may receive a collection of digital fingerprints with associated data for a particular video from a server and store them locally. This collection of fingerprints may contain user fingerprints from other users, user fingerprints from this user, and/or master fingerprints. During playback of that video, fingerprint matching module 235 may compare the fingerprints received from the server (e.g., fingerprints with associated data) to those fingerprints generated by fingerprint generator 215 (e.g., newly generated user fingerprints) in order to use the associated data at the appropriate point in the video. In another embodiment, a user device may receive a collection of fingerprints with associated data for a number of works and store them locally. In another embodiment, a user device may receive fingerprints with associated data for a number of works, all the data originating from a particular source.

Data action module 231 is configured to display data associated with a work at a particular point in the work and/or to perform other actions at the particular point in the work. In one embodiment, data action module 231 may receive a notification during playback of a work that there is data associated with a particular point in a segment of that work. Data action module 231 may then present the data on the user device at the appropriate point during playback. For example, during playback of a video, data action module 231 may receive notification from fingerprint matching module 235 that there is text commentary associated with a particular point in the video. Data action module 231 may then present a window on the screen of the user device to display the text commentary on the screen. Alternatively, data action module may perform other actions at the particular point in the video, such as loading a web page, loading an application, communicating with a remote device or server, and so forth.

Figure 2B:
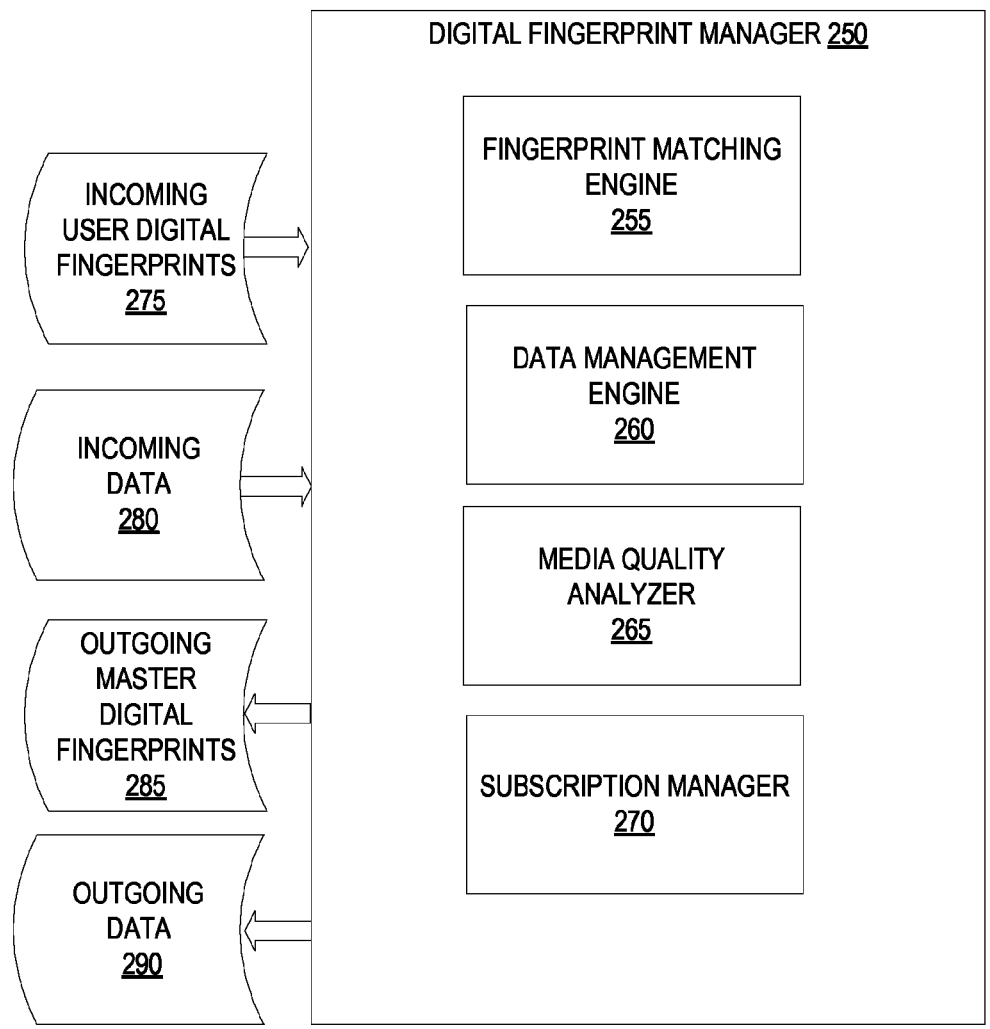
FIG. 2B is a block diagram of one embodiment of a digital fingerprint manager.

FIG. 2B is a block diagram of one embodiment of a digital fingerprint manager 250, which may correspond to the digital fingerprint manager 145 of FIG. 1. The digital fingerprint manager 250 may include one or more of a fingerprint matching engine 255, a data management engine 260, a media quality analyzer 265, and a subscription manager 270. Additionally, digital fingerprint manager 250 may receive incoming digital fingerprints 275 and incoming data 280, as well as transmit outgoing digital fingerprints 285 and outgoing data 290.

Fingerprint matching engine 255 is configured to match user digital fingerprints generated by a user device with high quality master digital fingerprints of known works stored on a server system. For example, a user device that captures user digital fingerprints of a work in order to associate data with particular points in that work may send the user digital fingerprints to fingerprint matching engine 255 as part of the process to store the associated data on the server Data management engine 260 is configured to store and distribute data entered by a user device associated with a work at a particular point in the work. Data may be stored in a storage facility such as data storage 160 from FIG. 1. In one embodiment, data management engine 260 receives incoming data 280 in combination with incoming user digital fingerprints 275. Once the incoming user digital fingerprints 275 are matched with master digital fingerprints of known works via fingerprint matching engine 255, the incoming data 280 may be stored on the server and associated with the master digital fingerprints of the known work. In another embodiment, when a user device subscribes to data of a known work, data management engine 260 is invoked to query the data storage and transmit outgoing data 290 to the user device. In another embodiment the user device requests a master fingerprint from the data management engine, does the matching on the user device, potentially extracts an appropriate portion of the master fingerprint, and returns that to the data management engine with the data.

Media quality analyzer 265 is configured to analyze the quality of media being played back on the user device. Such an analysis may be made based on the incoming user digital fingerprints 275 received from the user device. In one embodiment, media quality may be analyzed using objective audio and video techniques known in the art such as signal-to-noise ratio (SNR) or peak signal-to-noise ratio (PSNR). Media quality analyzer 265 may also examine an audio or video work for the presence of network transmission artifacts during playback when compared to a master copy to determine whether the transmitted signal has been degraded. In one embodiment, a received fingerprint includes an associated media quality value that may have been generated by a producer module that generated the fingerprint. The producer module may have generated the media quality value using the above described techniques.

Alternatively, media quality analyzer 265 may determine the media quality from the digital fingerprint itself. For example the producer module may determine that the user fingerprint matches poorly with a master fingerprint thus indicating that the user fingerprint was generated from a poor quality rendering of the original work or that substantial noise was included in the sampling of the work from a microphone or camera. The producer module may determine that the digital user fingerprint matches in some segments but not in others. The producer module may infer that the user fingerprint was generated from a rendering that included pauses, or that failed to render some sections of the original work.

The incoming user fingerprints may be replaced in the outgoing digital fingerprint with the master fingerprints stored on the server for the particular segment of the work. Media quality analyzer 265 may thus lower network traffic and limit processing when the work being played back is known to be a higher quality sample such as a movie stored locally on the device or being streamed via a high speed broadband connection. Additionally, replacing fingerprints determined to be degraded may improve performance when matching against the same work in future playbacks. Alternatively, the fingerprint may be replaced with the corresponding fingerprint of the master copy of the work regardless of the media quality.

Subscription manager 270 is configured to process subscription requests from user devices. In one embodiment, a user device sends a request to the server to receive all data and associated fingerprints entered for a particular work or by a particular entity. In one embodiment, the entity may be a user who enters data associated with a media work. For example, a user may associate commentary data with particular points in a video work. In another embodiment, the entity may be an automated transcription service that associated data with a media work from a data store. For example, an automated service may add statistical information at particular points in a broadcast of an athletic event, such as historical batting averages of baseball players during the broadcast of a baseball game. As another example, an automated service may add purchase information for items that are shown in a particular scene of a television show. As another example, an automated service may add travel information for a location mentioned in a song. Subscription manager 270 receives this request, and operates in conjunction with fingerprint matching engine 255 and data management engine 260 to transmit the data and fingerprints associated with a work to user devices of subscribing users.

Figure 3:
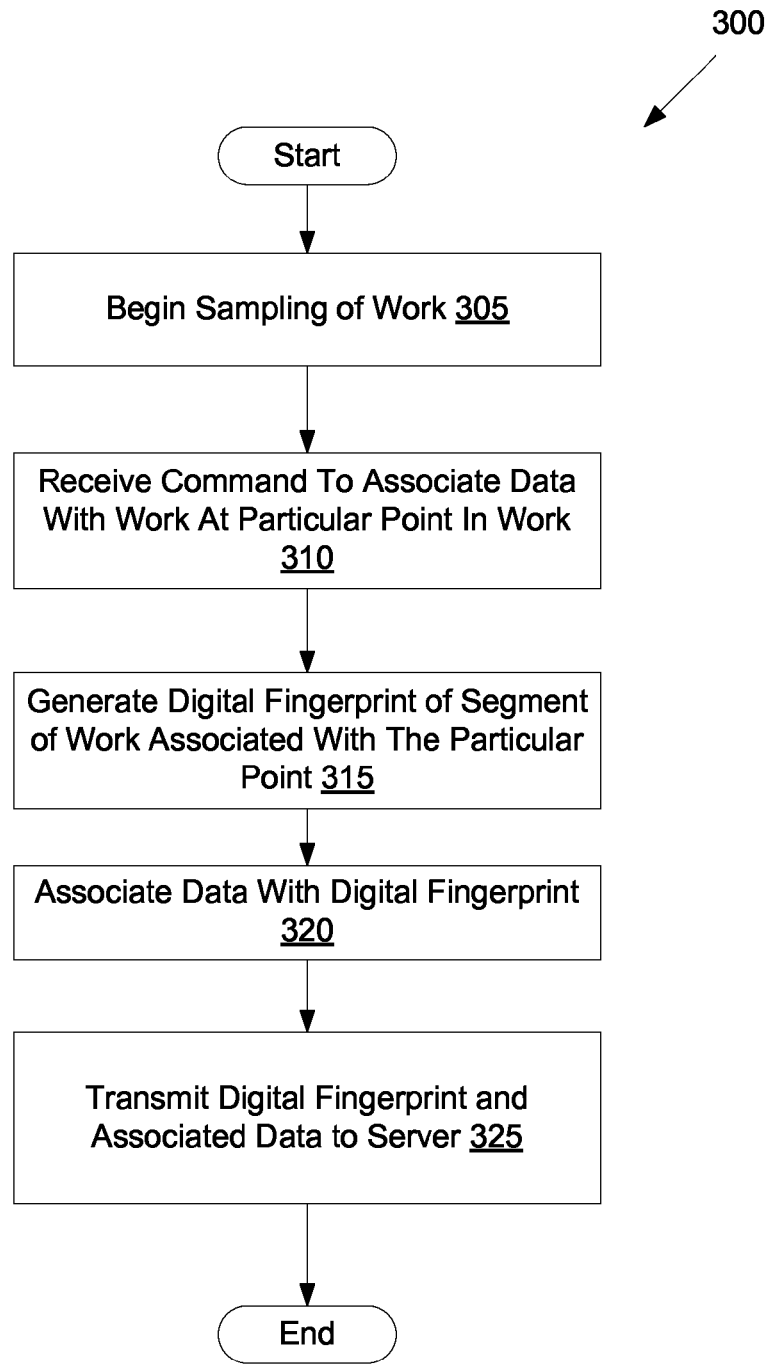
FIG. 3 is a flow diagram showing an embodiment for a method of associating data with a digital fingerprint.

FIG. 3 is a flow diagram of an embodiment for a method 300 of associating data with a digital fingerprint. Method 300 is performed by processing logic that may comprise hardware (circuitry, dedicated logic, etc.), software (such as is run on a general purpose computer system or a dedicated machine), or a combination of both. In one embodiment, the method 300 is performed by a user device 105-110 of FIG. 1. For example, the method of FIG. 3 may be performed by a client media manager of a user device.

At block 305 of method 300, processing logic begins sampling of a work on a computing device. In one embodiment, the sampling may be of a media file or stream playing back on the device itself. In another embodiment, the sampling may be of a work being played on another device directly coupled to the computing device. In another embodiment, the sampling may be an audio and/or video sampling of the environment of the user device using a microphone or camera coupled to or contained within the user device. The sampling may capture segments of the work. In one embodiment, the computing device may be a personal computer. In an alternative embodiment, the computing device may be a tablet computer, smartphone, PDA, smart TV, smart eyewear, or the like on which media can be played or sampled. In an example, a television or radio or Internet broadcast may be played by a TV or radio, and a microphone or video camera coupled to the computing device may pick up the played TV or radio broadcast.

At block 310, processing logic receives a command to associate data with the work being played at a particular point in the work. In one embodiment the point in the work is specified by the user indicating that the data should be associated with the point in the work that has just been rendered. In one embodiment, the data may represent text commentary manually entered by the user via a keyboard. In an alternative embodiment, the data may be a uniform resource locator (URL), a video, a sound effect, or a command. In another embodiment the data may be a new work created by the user, such as a video, a drawing, or a bit of audio commentary. Other types of data are also envisioned. At block 315, processing logic generates a user digital fingerprint of the segment of the work associated with the particular point in the work identified at block 310. At block 320, processing logic associates the data created at block 310 with the user digital fingerprint generated at block 315. This may include generating a single file that contains both the data and fingerprint. Alternatively, the data and fingerprint may be generated and stored separately and connected logically using a reference link or digital pointer (such as a hyperlink).

At block 325, processing logic transmits the user digital fingerprint and associated data to a server system, which may be, for example, a cloud based server and/or a server provided by a wireless carrier. The server may then store the user digital fingerprint and associated data on the server system. In one embodiment, the server may store the digital fingerprint and associated data together in a single record of a relational database. In another embodiment, the server system may store the digital fingerprint and associated data separately, such as in fingerprint storage 155 and data storage 160 from FIG. 1 respectively.

Figure 4:
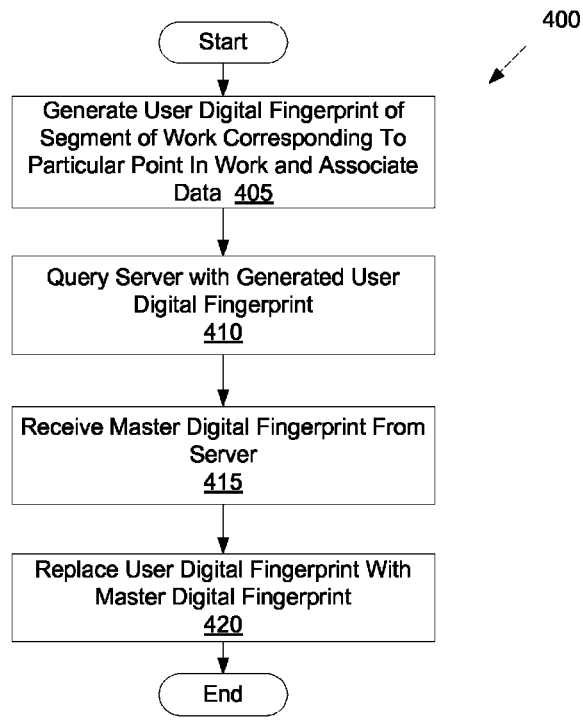
FIG. 4 is a flow diagram showing an embodiment for a method of replacing a digital fingerprint on a user device with a digital fingerprint of a master copy of a work.

FIG. 4 is a flow diagram showing an embodiment for a method 400 of replacing a user digital fingerprint on a user device with a master digital fingerprint of a master copy of a work. Method 400 is performed by processing logic that may comprise hardware (circuitry, dedicated logic, etc.), software (such as is run on a general purpose computer system or a dedicated machine), or a combination of both. In one embodiment, the method 400 is performed by a user device 105-110 of FIG. 1. For example, the method of FIG. 4 may be performed by a client media manager of a user device.

At block 405 of method 400, processing logic generates a user digital fingerprint of a segment of a work that corresponds to a particular point in the work and associates data with the user fingerprint. At block 410, processing logic queries a server with the user digital fingerprint generated in block 405. The server system may analyze a quality of the user digital fingerprint and if found not to meet a predetermined threshold, send a replacement master digital fingerprint to the user device. In one embodiment, the server may do so from media quality analyzer 265 in FIG. 2B. At block 415, processing logic receives a master digital fingerprint from the server. At block 420, processing logic replaces the user digital fingerprint generated in block 405 with the new master digital fingerprint received from the server in block 415.

In one embodiment, a user may play or sample a work on a user device, and enter data associated with that work to be replayed at a later time on that same user device or a different user device. In this embodiment, the user device may be streaming a video from an online source where playback quality is low, thereby resulting in a low quality user digital fingerprint generated on the user device. In another embodiment, the user device may be sampling the rendered work via a microphone or camera, thereby resulting in a sample of media contaminated by environmental noise. The user device may query a server to obtain a higher quality master digital fingerprint of the work from a database of fingerprints of known works to replace the generated user fingerprint in order to prevent possible problems during later playback.

Figure 5:
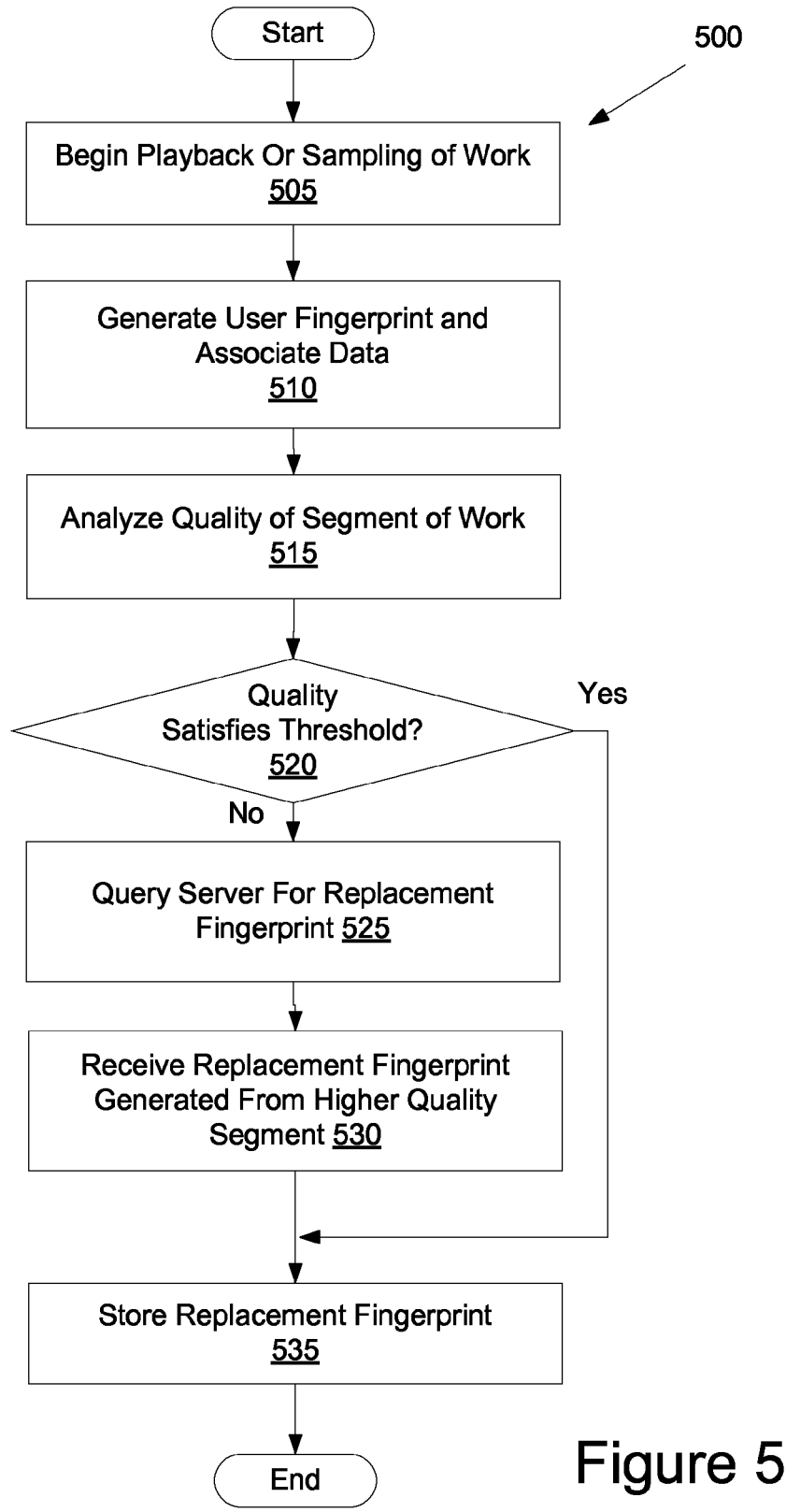
FIG. 5 is a flow diagram showing an embodiment for a method of replacing a digital fingerprint on a user device based on the quality of a work during playback.

FIG. 5 is a flow diagram showing an embodiment for a method 500 of replacing a user digital fingerprint on a user device based on the quality of a work during playback or sampling. Method 500 is performed by processing logic that may comprise hardware (circuitry, dedicated logic, etc.), software (such as is run on a general purpose computer system or a dedicated machine), or a combination of both. In one embodiment, the method 500 is performed by a user device 105-110 of FIG. 1. For example, the method of FIG. 5 may be performed by a client media manager of a user device.

At block 505 of method 500, processing logic begins sampling or playback of a work by a user device. At block 510, processing logic generates a user digital fingerprint of a segment of the work at a particular point in the work and associates data with the fingerprint. At block 515, processing logic analyzes the quality of the segment of the work processed in block 510. At block 520, processing logic determines whether the quality of the segment of the work analyzed at block 515 satisfies a predetermined threshold. For example, a threshold may be set for video quality limiting the number of frames that can be dropped due to online bandwidth limitations. Additionally, a threshold may be set for an audio track that limits the amount of audio noise encountered during the playback of the segment.

If at block 520 processing logic determines that the segment quality meets the threshold, the method continues to block 535, and processing logic stores the user digital fingerprint. If not, the method continues to block 525, and processing logic queries a server for a replacement fingerprint. The query may include a copy of the generated user digital fingerprint. At block 530, processing logic receives a replacement fingerprint generated from a higher quality segment stored on the server system. At block 530 the received replacement fingerprint may be a master fingerprint of a known work or a higher quality user fingerprint.

At block 535, processing logic stores the digital fingerprint on the user device. If a replacement fingerprint was received by the server based on the threshold analysis conducted at block 520, the replacement is stored. Otherwise, the original user fingerprint is stored. The method may repeat continuously so long as a work is being played and data is being entered on the user device.

Figure 6:
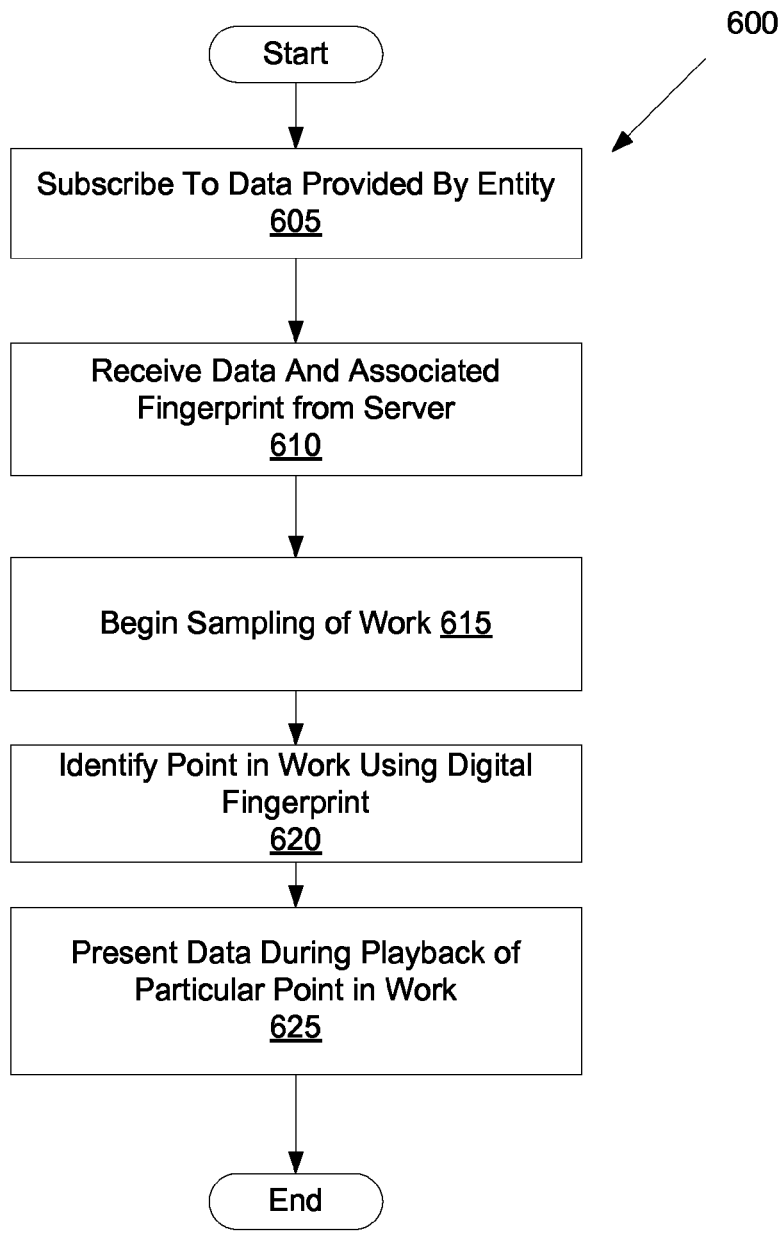
FIG. 6 is a flow diagram showing an embodiment for a method of subscribing to data associated with a work for display during playback by a client device.

FIG. 6 is a flow diagram showing an embodiment for a method 600 of subscribing to data associated with a work for display during playback by a client device. Method 600 is performed by processing logic that may comprise hardware (circuitry, dedicated logic, etc.), software (such as is run on a general purpose computer system or a dedicated machine), or a combination of both. In one embodiment, the method 600 is performed by a user device 105-110 of FIG. 1. For example, the method of FIG. 6 may be performed by a client media manager of a user device.

At block 605 of method 600, processing logic subscribes to data provided by another entity. In one embodiment, the entity may be a user who enters data associated with a media work. For example, a user may associate text commentary data with particular points in a video work. In another embodiment, the entity may be an automated transcription service that associated data with a media work from a data store. For example a user may subscribe to all data entered by some particular user. For example a user may subscribe to all data entered by some particular transcription service. For example a user may subscribe to all data entered by any entity for a particular work.

In another embodiment, tags may be categorized, and processing logic may request all tags of a particular category that is associated with any work. For example, a user may subscribe to tags that that have been categorized as being associated with a particular celebrity, animal, science, politics, or other subject matter. These categories may be indicated by a user who generates the data. Alternatively, the data may be categorized using an automated categorization process or through a human mediated editorial process. Automated categorization may be performed by parsing data and analyzing it using one or more categorization rules. Each categorization rule may search for specific terms, words, phrases, etc. If such information is found, the rule may cause the data to be categorized with a category associated with that rule.

At block 610, processing logic receives data and associated fingerprints from a server. In one embodiment, a user device may receive all data and fingerprints for a particular work generated by the entity to which the user device is subscribed so that they may be stored on the user device prior to playback. For example, a user that intends to play a particular movie on a device may download all data and associated fingerprints from the server prior to playback in order to improve operating efficiency and reduce the risk of issues arising during transmission during playback. In another embodiment the device uses a user fingerprint to identify the work that is being sampled and downloads tags associated with the work.

At block 615, processing logic begins sampling of the work on the user device. At block 620, processing logic identifies a point in the work using the digital fingerprint that is associated with data received from the server. This may be performed by generating a sequence of overlapping digital fingerprints of the work during playback of the work. These digital fingerprints may be compared to the digital fingerprint associated with the data. If a matching digital fingerprint is found, the data may be used when the segment that was used to generate the matching fingerprint is played. For example, during the playback of a video on a device, processing logic may identify a particular point in the video where a prior user had associated text commentary. In another embodiment, during the viewing of a television show, processing logic may identify a particular point in the show where a URL should be displayed. At block 625, processing logic uses the data during playback of the particular point in the work. In one embodiment, if a prior user had entered text commentary regarding the particular point in the work, processing logic would display that commentary on the user device such that it is viewable by the user. In another embodiment, if a prior user had entered a video regarding the particular point in the work, processing logic would display that video on the user device such that it is viewable by the user. This presentation may consume the entire display surface. Alternatively this presentation may take place in a window consuming only a portion of the display surface. Alternatively the featured presentation may be reduced to a window consuming only a portion of the display surface and the presentation may consume the rest of the surface. Alternatively the presentation may be audio and play without consuming any of the visual display surface. Alternatively the featured presentation may pause while the prior user's video and audio is played. Alternatively the presentation may be made on another device, operatively coupled to the user device. Alternatively the user device may command another device to begin the presentation. As discussed above, other actions may also be performed based on the data at the particular point in the work.

Figure 7:
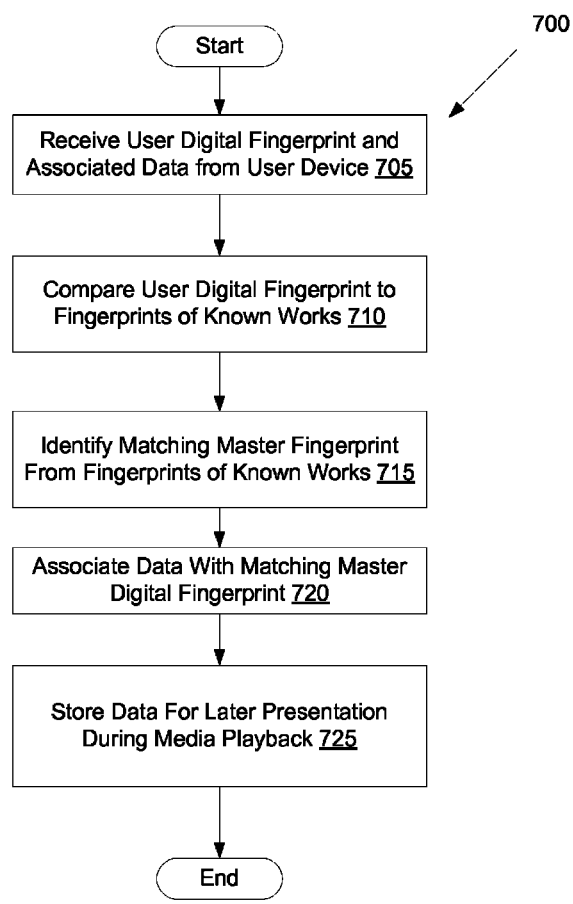
FIG. 7 is a flow diagram showing an embodiment for a method of processing digital fingerprints and associated data received by a server.

FIG. 7 is a flow diagram showing an embodiment for a method 700 of processing digital fingerprints and associated data received by a server. Method 700 is performed by processing logic that may comprise hardware (circuitry, dedicated logic, etc.), software (such as is run on a general purpose computer system or a dedicated machine), or a combination of both. In one embodiment, the method 700 is performed by a server system 140 of FIG. 1. For example, the method of FIG. 7 may be performed by a digital fingerprint manager of a server system.

At block 705 of method 700, processing logic receives a digital fingerprint and associated data from a user device. At block 710, processing logic compares the user digital fingerprint received to a collection of master digital known work fingerprints stored on the server system such as in fingerprint storage 155 of FIG. 1. At block 715, processing logic identifies an additional fingerprint from the collection of master fingerprints of known works or some portion thereof that approximately matches the user digital fingerprint received at block 705. A person skilled in the art will recognize that there are a plethora of digital fingerprint techniques available to perform this matching. In one embodiment, the method may identify fingerprints matching known works such as movies, songs, episodic video, user generated video, speeches, paintings, photographs, or the like.

At block 720, processing logic associates the data received with the matching master digital fingerprint stored on the server. In one embodiment, the associated data may be located in the same data store record as the stored digital fingerprint. In another embodiment, the associated data may be referenced by the stored digital fingerprint via a pointer or other linking mechanism known in the art such that the associated data and digital fingerprint need not be in the same storage media. At block 725, processing logic stores the associated data for later presentation during media playback. In one embodiment, the associated data may be stored on the server system in data storage 160 of FIG. 1.

Figure 8:
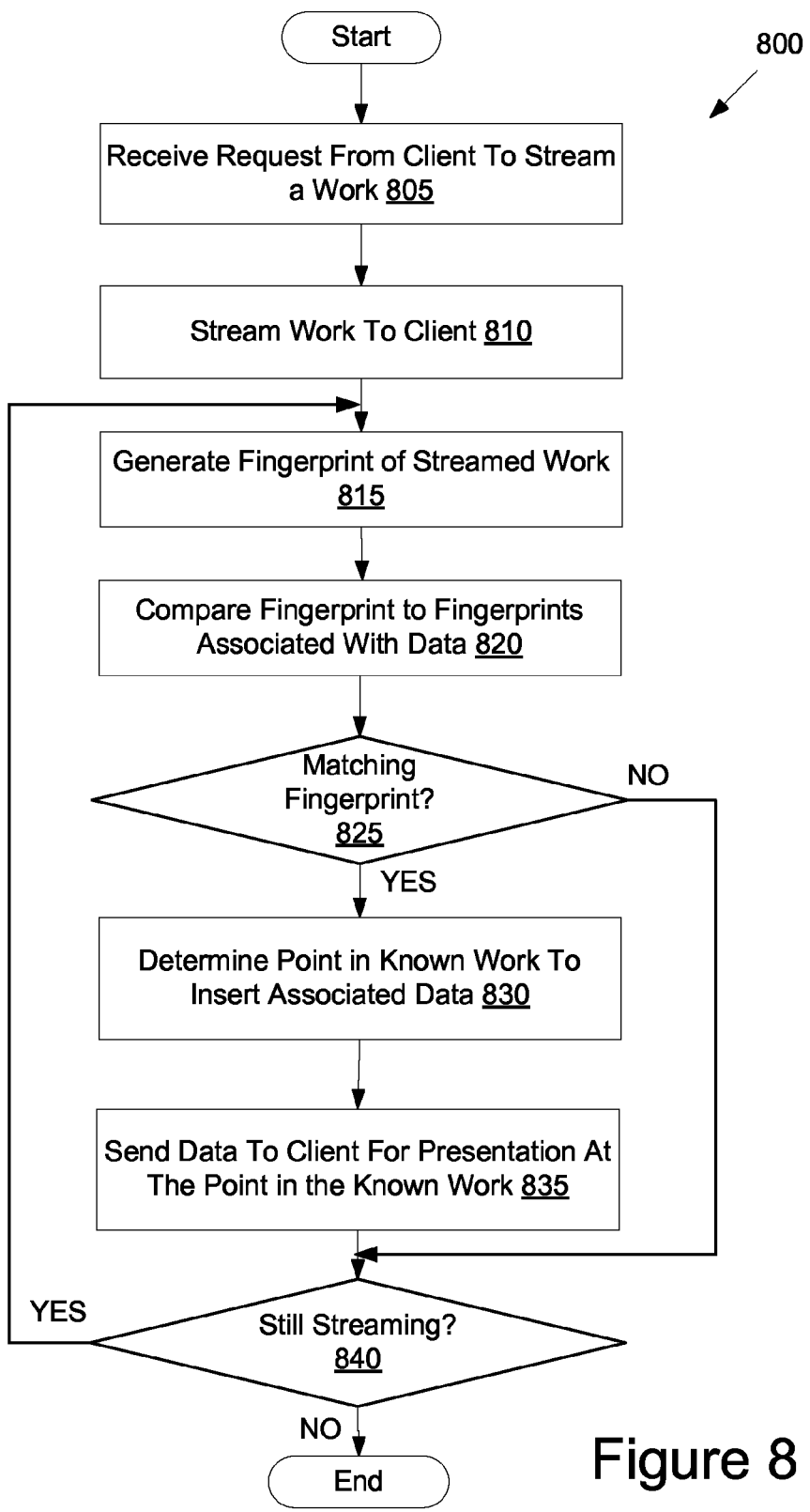
FIG. 8 is a flow diagram showing an embodiment for a method of streaming media work to a client with associated data.

FIG. 8 is a flow diagram showing an embodiment for an optional method 800 of streaming media work to a client with associated data. Method 800 is performed by processing logic that may comprise hardware (circuitry, dedicated logic, etc.), software (such as is run on a general purpose computer system or a dedicated machine), or a combination of both. In one embodiment, the method 800 is performed by a server system 140 of FIG. 1. For example, the method of FIG. 8 may be performed by a media server of a server system.

At block 805 of method 800, processing logic receives a request from a client to stream a known work. In one embodiment, a client may be a playback module 122 that executes on a user device 105-110 of FIG. 1. For example, the client may be a personal computer, tablet computer, smart phone, smart eyewear, or other computing device. Since server systems generally possess more processing power than client devices, the processing used to determine the particular point in a work to present associated data may be conducted by the server and streamed to the client such that the client need only display the contents of the stream without further intervention. This method allows for client devices with limited processing resources to receive associated data at the proper point in the playback of a work.

At block 810, processing logic streams the known work to the client. It is understood that the method may utilize streaming technologies and known network protocols known in the art to transmit the media to the client across a network. In one embodiment, the method may access a media server such as media server 150 of FIG. 1 to stream the media to the client via network 135 of FIG. 1.

At block 815, processing logic generates a user fingerprint of the streamed work. At block 820, processing logic compares the user digital fingerprint generated at block 815 to fingerprints associated with stored data. At block 825, processing logic determines whether the generated user fingerprint matches a stored fingerprint associated with the data. If so, the method continues to block 830. Otherwise, the method proceeds to block 840, At block 830, processing logic determines the point in the known work to insert data associated with the matching fingerprint. At block 835, processing logic sends the associated data to the client for presentation at the point in the known work. In one embodiment, the method may send the associated data embedded in the work as part of a single stream of data. In another embodiment, the method may establish two connections, ports, or "threads" with the client device sending the work and the associated data separately to be received by the client application. The client may simply present the work and the data without performing any additional processing to determine where to insert the data. At block 840, processing logic determines whether the work is still being streamed. If so, the method returns to block 815. Otherwise, the method ends.

Figure 9:
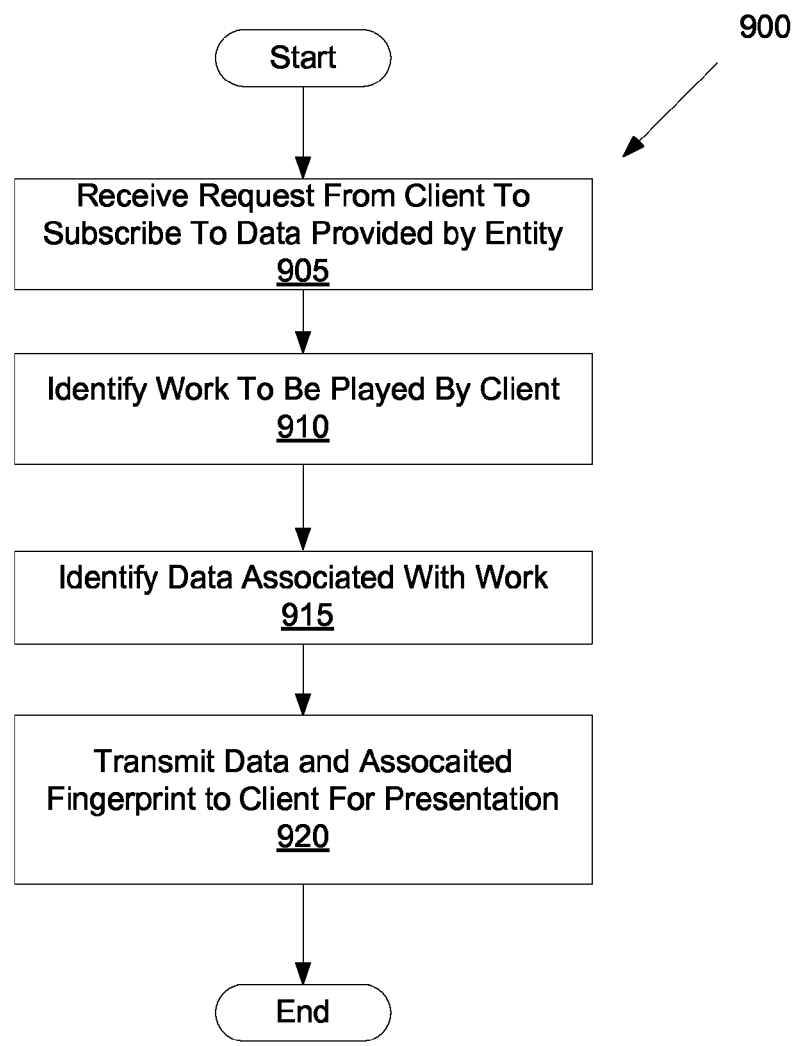
FIG. 9 is a flow diagram showing an embodiment for a method of processing client requests for data subscriptions by a server.

FIG. 9 is a flow diagram showing an embodiment for a method 900 of processing client requests for data subscriptions by a server. Method 900 is performed by processing logic that may comprise hardware (circuitry, dedicated logic, etc.), software (such as is run on a general purpose computer system or a dedicated machine), or a combination of both. In one embodiment, the method 900 is performed by a server system 140 of FIG. 1. For example, the method of FIG. 9 may be performed by a subscription manager 220 of FIG. 2B.

At block 905 of method 900, processing logic receives a request from a client to subscribe to data provided by an entity. Alternatively, the request may be to subscribe to data having a particular categorization. At block 910, processing logic identifies a work to be played by the client. In one embodiment, processing logic may receive a digital fingerprint from a client to identify the work. In another embodiment, processing logic may receive the identity of the work (e.g., as part of the subscription request received at block 905). For example, processing logic may receive a request from a client to subscribe to all commentary for a specific video work.

At block 915, processing logic identifies data associated with the work. In one embodiment, the method may identify this information by utilizing data storage 160 of FIG. 1. At block 920, processing logic transmits the data and an associated fingerprint to the requesting client for use. In one embodiment, the method may transmit all data and fingerprints for the work to the client such that the client can store the information and use the data when the work is played back or sampled at some later time. In an alternative embodiment, the method may transmit the data as the work is being played back on the client. In another embodiment, the method may transmit all data and fingerprints from a particular user to the subscribing client such that the client can store the information and make use of it whenever the work is played or sampled.

Figure 10:
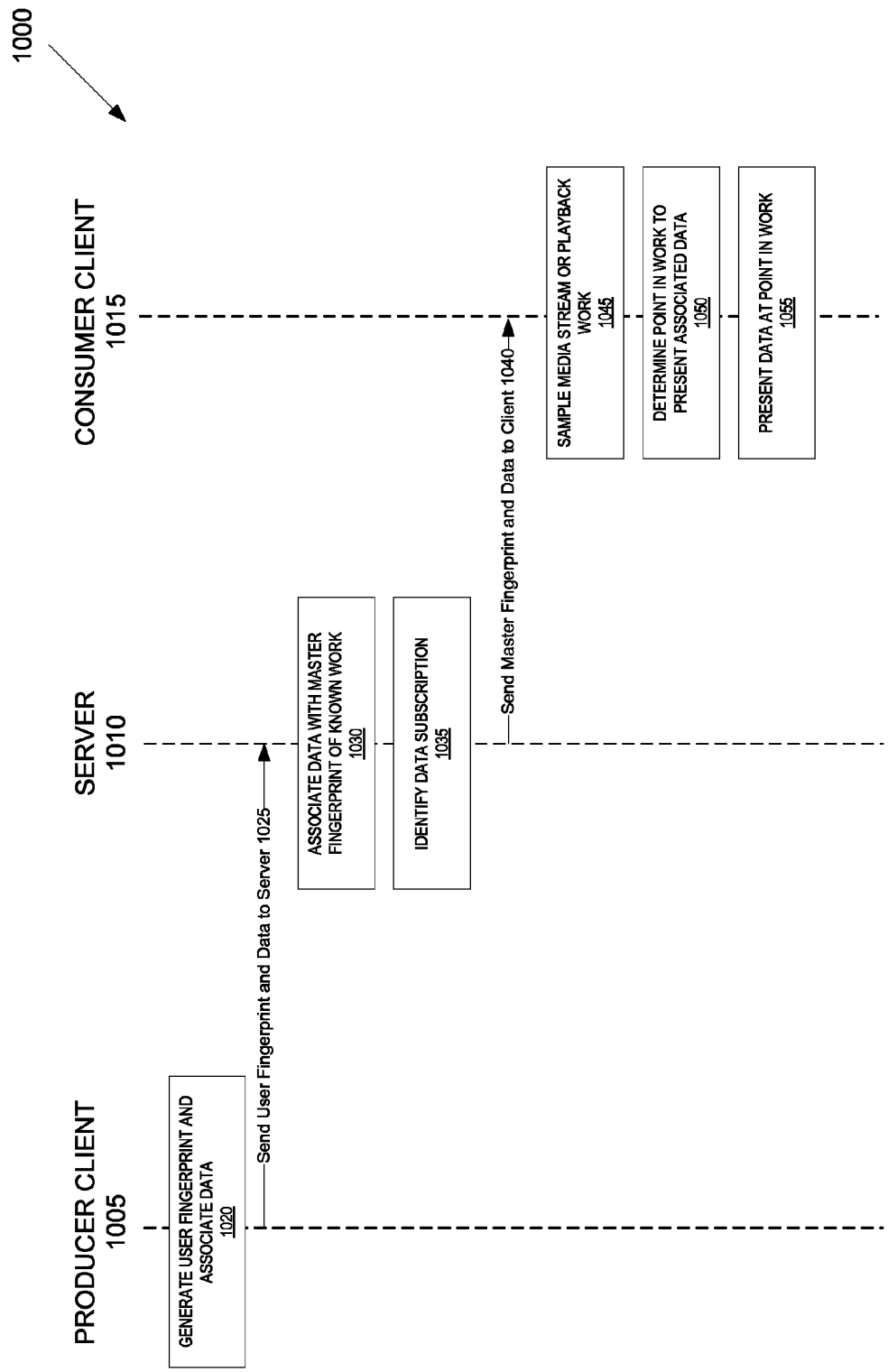
FIG. 10 illustrates a sequence diagram of transmission of digital fingerprints and data between a producer client, a server, and a consumer client, in accordance with one embodiment of the present invention.

FIG. 10 illustrates a sequence diagram of an example transmission of digital fingerprints and data between a producer client 1005, a server 1010, and a consumer client 1015, in accordance with one embodiment of the present invention. In one embodiment, producer client 1005 and/or consumer client 1015 may be user devices 105-110 of FIG. 1. In one embodiment, producer client 1005 and consumer client 1015 may logically represent the same physical device. In one embodiment, server 1010 may be server system 140 of FIG. 1.

At block 1020, the producer client 1005 generates a user fingerprint of a segment of a work and associates data with the fingerprint. Producer client 1005 then executes processing logic to send the user fingerprint and data to server 1025. At block 1030, the server associates the data and user fingerprint received with a known work fingerprint of a known work. The data is then stored on the server system. In one embodiment, the data is stored in data storage 160 of FIG. 1.

At block 1035, the server identifies a data subscription to the data stored at block 1030. The server then executes processing logic to send fingerprint and data to client 1040. Consumer client 1015 receives the fingerprint and data and begins sampling a media stream (or playback of a work) at block 1045. At block 1050, consumer client 1015 determines a point in the work to present the associated data. At block 1055, consumer client 1015 presents the data at the particular point in the work.

Note that the above embodiments have been described with reference to recorded works. However, embodiments of the present invention may additionally be applied to live video recordings. For example, a user may include a video camera that records a scene at a particular location (e.g., at Alcatraz island). The video camera may additionally include a display that presents the image being recorded. In one embodiment, the user may add data to the generated video recording, which may be sent to a server along with an associated fingerprint. When another individual takes an image of the same scene, his video camera may receive the data, and may present the data previously entered by the first user when the scene is detected. In one embodiment, a geo-location is associated with the data and fingerprint. When a user device determines that it is at that geo-location, it may retrieve data that has been recorded by other users at that geo-location.

Figure 11:
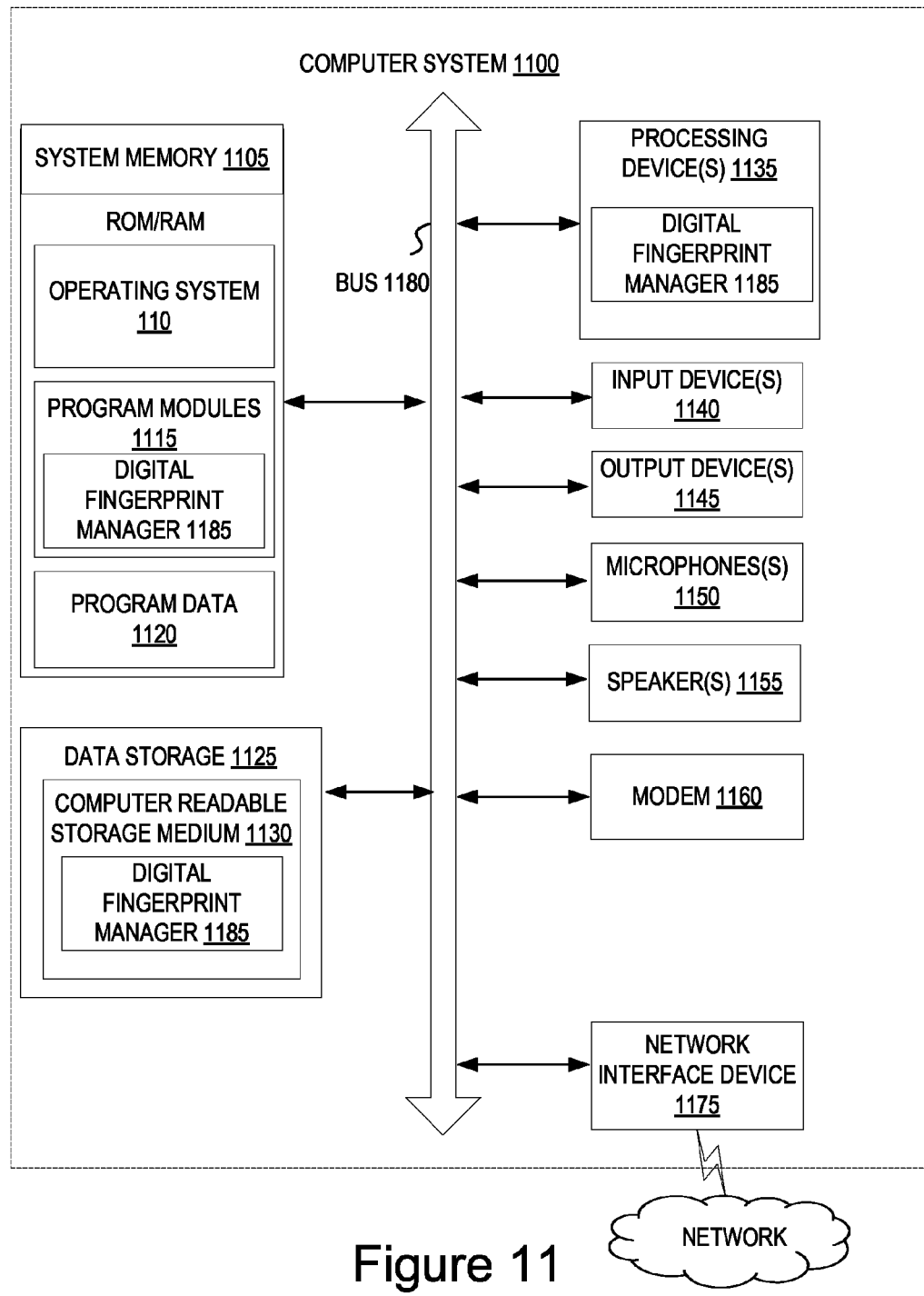
FIG. 11 is a block diagram illustrating an exemplary computer system, in accordance with one embodiment of the present invention.

FIG. 11 is a block diagram illustrating an exemplary computer system 1100 configured to perform any one or more of the methodologies performed herein. In one embodiment, the computer system 1100 corresponds to a user device 105-110 of FIG. 1. For example, computer system 1100 may be any type of computing device such as a PDA, a mobile phone, a laptop computer, a portable media player, a tablet computer, a camera, a video camera, a netbook, a desktop computer, a gaming console, a DVD player, a computing pad, a media center, and the like. Computer system 1100 may also correspond to one or more devices of the server system 140 of FIG. 1. For example, computer system 100 may be a rackmount server, a desktop computer, a network router, switch or bridge, or any other computing device. The computer system 1100 may operate in the capacity of a server or a client machine in client-server network environment, or as a peer machine in a peer-to-peer (or distributed) network environment. Further, while only a single machine is illustrated, the computer system 1100 shall also be taken to include any collection of machines that individually or jointly execute a set (or multiple sets) of instructions to perform any one or more of the methodologies discussed herein.

The computer system 1100 includes one or more processing devices 1135, which may include general-purpose processing devices such as central processing units (CPUs), microcontrollers, microprocessors, systems on a chip (SoC), or the like. The processing devices 1135 may further include field programmable gate arrays, dedicated chipsets, application specific integrated circuits (ASIC), a field programmable gate arrays (FPGA), digital signal processors (DSP), network processors, or the like. The computer system 1100 also includes system memory 1105, which may correspond to any combination of volatile and/or non-volatile storage mechanisms. The system memory 1105 stores information which may provide an operating system component 1110, various program modules 1115 such as digital fingerprint manager 1185, program data 1120, and/or other components. The computer system 1100 may perform functions by using the processing device(s) 1135 to execute instructions provided by the system memory 1105. Such instructions may be provided as software or firmware. Alternatively, or additionally, the processing device(s) 1135 may include hardwired instruction sets (e.g., for performing functionality of the digital fingerprint manager 1185). The processing device 1135, system memory 1105 and additional components may communicate via a bus 1180.

The computer system 1100 also includes a data storage device 1125 that may be composed of one or more types of removable storage and/or one or more types of non-removable storage. The data storage device 1125 includes a computer-readable storage medium 1130 on which is stored one or more sets of instructions embodying any one or more of the methodologies or functions described herein. As shown, instructions for the digital fingerprint manager 1185 may reside, completely or at least partially, within the computer readable storage medium 1130, system memory 1105 and/or within the processing device(s) 1135 during execution thereof by the computer system 1100, the system memory 1105 and the processing device(s) 1135 also constituting computer-readable media. While the computer-readable storage medium 1130 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The computer system 1100 may also include one or more input devices 1140 (keyboard, mouse device, specialized selection keys, etc.) and one or more output devices 1145 (displays, printers, audio output mechanisms, etc.). In one embodiment, the computer system 1100 is a user device that includes one or more microphones 1150 and one or more speakers 1155.

The computer system may additionally include a wireless modem 1160 to allow the computer system 1100 to communicate via a wireless network (e.g., such as provided by a wireless communication system) with other computing devices, such as remote user devices, a server system, and so forth. The wireless modem 1160 allows the computer system 1100 to handle both voice and non-voice communications (such as communications for text messages, multimedia messages, media downloads, web browsing, etc.) with a wireless communication system. The wireless modem 1160 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1xRTT), evaluation data optimized (EVDO), high-speed down-link packet access (HSDPA), WiFi, long term evolution (LTE), worldwide interoperability for microwave access (WiMAX), etc.

Computer system 1100 may additionally include a network interface device 1175 such as a network interface card (NIC) to connect to a network.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "generating", "associating", "querying", "analyzing", "replacing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Some portions of the detailed description are presented in terms of methods. These methods may be performed by processing logic that may comprise hardware (circuitry, dedicated logic, etc.), software (such as is run on a general purpose computer system or a dedicated machine), or a combination of both. In certain embodiments, the methods are performed by a user device, such as user devices 105-110 of FIG. 1. In other embodiments, the methods are performed by server devices, such as server system 140 of FIG. 1.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by a user device, a command to associate data with a work at a particular point in the work;
   generating, by the user device, a user digital fingerprint of a segment of the work, wherein the segment corresponds to the particular point in the work, and wherein the user digital fingerprint comprises a feature vector of the segment of the work generated by the user device; and
   associating the data with the user digital fingerprint, wherein the user digital fingerprint associated with the data is usable to identify the particular point in the work at which an action associated with the data is to be performed.

2. The method of claim 1, wherein said data comprises at least one of a text commentary, a digital image, a uniform resource locator (URL), a video, a sound effect, or a command.

3. The method of claim 1, further comprising:
   querying a server, the query comprising the user digital fingerprint;
   receiving a master digital fingerprint of a segment of a copy of the work from the server, the segment of the copy corresponding to the segment of the work, wherein the master digital fingerprint comprises a feature vector of a high quality version of the work; and
   replacing the user digital fingerprint with the master digital fingerprint.

4. The method of claim 3, further comprising:
   analyzing a quality of the segment of the work based on at least one of characteristics of the segment or characteristics of the user digital fingerprint; and
   querying the server in response to determining, based on the analysis, that the quality of the segment of the work fails to satisfy a quality threshold.

5. The method of claim 1, further comprising:
   transmitting the user digital fingerprint and associated data to a server for later use during playback of the work on a computing device.

6. The method of claim 1, further comprising:
   sending a request to a server to subscribe to additional data provided by an entity that generated the additional data;
   receiving the additional data and an additional fingerprint associated with the additional data, the additional fingerprint having been generated from an additional segment of the work that corresponds to an additional point in the work;
   during playback of the work on the user device, identifying the additional point in the work using the additional fingerprint; and
   presenting, by the user device, the additional data during the playback of the additional point in the work.

7. The method of claim 6, wherein identifying the additional point in the work comprises:
   generating a plurality of fingerprints for a plurality of segments of the work; and
   comparing the additional fingerprint to the plurality of fingerprints to find one of the plurality of fingerprints that approximately matches the additional fingerprint.

8. A method comprising:
   receiving, by a computing device, a digital fingerprint of a segment of a work and data associated with the digital fingerprint, wherein the digital fingerprint comprises a feature vector of the segment of the work and is usable to identify a particular point in the work at which an action associated with the data is to be performed;
   comparing, by the computing device, the digital fingerprint to a collection of digital fingerprints of known works, each of the collection of digital fingerprints comprising a feature vector of a segment of a known work;
   identifying an additional digital fingerprint from the collection of digital fingerprints that approximately matches the digital fingerprint of the segment of the work, wherein the additional digital fingerprint is of a segment of a known work that corresponds to the segment of the work;
   associating, by the computing device, the data with the matching digital fingerprint; and
   storing the data by the computing device, wherein the data is configured to be presented during playback of the segment of the known work.

9. The method of claim 8, wherein said data comprises at least one of a text commentary, a digital image, a uniform resource locator (URL), a video, a sound effect, or a command.

10. The method of claim 8, wherein the data comprises the digital fingerprint, the method further comprising:
    determining, based on the digital fingerprint, that the segment of the work is of a lower quality than a corresponding segment of the known work in the collection; and
    replacing the digital fingerprint in the data with the additional digital fingerprint.

11. The method of claim 8, further comprising:
    transmitting, by the computing device, the additional digital fingerprint and the data back to a client device from which the digital fingerprint was received.

12. The method of claim 8, further comprising:
    receiving a request for the known work from a client;
    streaming the known work to the client;

determining, based on the additional digital fingerprint, a point in the known work to insert the data; and sending the data to the client such that the data will be presented to the client at the point in the known work.

13. The method of claim 8, further comprising:

receiving a request from a client to subscribe to data provided by an entity that generated the data; and transmitting the data and the additional digital fingerprint to the client, wherein the client determines, based on the additional digital fingerprint, a point in the known work to present the data.

14. A computer readable medium having instructions that, when executed by a processing device, cause the processing device to perform operations comprising:

sending a request to a server to subscribe to data associated with a work;

receiving the data and a digital fingerprint associated with the data, the digital fingerprint having been generated from a segment of the work that corresponds to a particular point in the work, wherein the digital fingerprint comprises a feature vector of the segment of the work;

during playback of the work, identifying, by the processing device, the point in the work using the digital fingerprint; and performing, by the processing device, an action associated with the data during the playback of the particular point in the work.

15. The computer readable medium of claim 14, the operations further comprising during playback of the work by the processing device, receiving a command to associate additional data with the work at an additional particular point in the work;

generating, by the processing device, a user digital fingerprint of an additional segment of the work, wherein the additional segment corresponds to the additional particular point in the work; and associating the additional data with the user digital fingerprint.

16. The computer readable medium of claim 15, the operations further comprising:

querying the server, the query comprising the user digital fingerprint;

receiving a master digital fingerprint of a segment of a copy of the work from the server, the segment of the copy corresponding to the additional segment of the work; and replacing the user digital fingerprint with the master digital fingerprint.

17. The computer readable medium of claim 16, the operations further comprising:

analyzing a quality of the additional segment of the work based on at least one of characteristics of the additional segment or characteristics of the user digital fingerprint; and querying the server in response to determining, based on the analysis, that a quality of the additional segment of the work fails to satisfy a quality threshold.

18. The computer readable medium of claim 15, the operations further comprising:

transmitting the user digital fingerprint and associated data to the server for later use during playback of the work on a computing device.

19. A computer readable medium having instructions that, when executed by a processing device, cause the processing device to perform operations comprising:

receiving a user digital fingerprint of a segment of a work and data associated with the user digital fingerprint, wherein the user digital fingerprint comprises a feature vector of the segment of the work generated by a user device and is usable to identify a particular point in the work at which an action associated with the data is to be performed;

comparing, by the processing device, the user digital fingerprint to a collection of master digital fingerprints of known works, wherein each master digital fingerprint of the collection of master digital fingerprints comprises a feature vector of a high quality version of a known work;

identifying a master digital fingerprint from the collection of master digital fingerprints that approximately matches the user digital fingerprint of the segment, wherein the master digital fingerprint is of a segment of a known work that corresponds to the segment of the work;

associating, by the processing device, the data with the master digital fingerprint; and storing the data, wherein the data is configured to be presented during playback of the segment of the known work.

20. The computer readable medium of claim 19, the wherein the data comprises the digital fingerprint, the operations further comprising:

determining, based on the user digital fingerprint, that the segment is of a lower quality than a corresponding segment of the known work in the collection; and replacing the user digital fingerprint in the data with the master digital fingerprint.

21. The computer readable medium of claim 19, the operations further comprising:

transmitting, by the processing device, the master digital fingerprint and the data back to a client device from which the user digital fingerprint was received.

22. The computer readable medium of claim 19, the operations further comprising:

receiving a request for the known work from a client;

streaming the known work to the client;

determining, based on the master digital fingerprint, a point in the known work to insert the data; and sending the data to the client such that the data will be presented to the client at the point in the known work.

23. The computer readable medium of claim 19, the operations further comprising:

receiving a request from a client to subscribe to data provided by an entity that generated the data;

transmitting the data and the master digital fingerprint to the client, wherein the client determines, based on the master digital fingerprint, a point in the known work to present the data.

24. A system, comprising:

a first computing device comprising a memory and a processor coupled with the memory, wherein the processor is to:

receive a user digital fingerprint of a segment of a work and data associated with the user digital fingerprint, wherein the user digital fingerprint comprises a feature vector of the segment of the work generated by a user device and is usable to identify a particular point in the work at which an action associated with the data is to be performed;

compare the user digital fingerprint to a collection of master digital fingerprints of known works, wherein each master digital fingerprint of the collection of master digital fingerprints comprises a feature vector of a high quality version of a known work;

identify a master digital fingerprint from the collection of master digital fingerprints that approximately matches the user digital fingerprint of the segment, wherein the master digital fingerprint is of a segment of a known work that corresponds to the segment of the work;

associate the data with the master digital fingerprint; and store the data, wherein the data is configured to be presented during playback of the segment of the known work.

25. The system of claim 24, wherein the data comprises the user digital fingerprint, the processor being further to:

determine, based on the user digital fingerprint, that the segment is of a lower quality than a corresponding segment of the known work in the collection; and replace the user digital fingerprint in the data with the master digital fingerprint.

26. The system of claim 24, wherein the processor is further to:

transmit the master digital fingerprint and the data back to a client device from which the user digital fingerprint was received.

27. The system of claim 24, wherein the processor is further to:

receive a request for the known work from a client;

stream the known work to the client;

determine, based on the master digital fingerprint, a point in the known work to insert the data; and send the data to the client such that the data will be presented to the client at the point in the known work.

28. The system of claim 24, wherein the processor is further to:

receive a request from a client to subscribe to data provided by an entity that generated the data; and transmit the data and the master digital fingerprint to the client, wherein the client determines, based on the master digital fingerprint, a point in the known work to present the data.

29. The system of claim 24, further comprising:

a second computing device networked to the first computing device, wherein the second computing device is to:

during playback of the work on the second computing device, receive a command to associate the data with the work at a particular point in the work;

generate the user digital fingerprint of the segment of the work, wherein the segment corresponds to the particular point in the work;

associate the data with the user digital fingerprint; and transmit the user digital fingerprint and associated data to the first computing device.

30. The system of claim 24, further comprising:

a second computing device networked to the first computing device, wherein the second computing device is to:

send a request to the first computing device to subscribe to a particular data category, wherein the data is associated with the particular data category;

receive the data and the master fingerprint associated with the data;

during playback of the work on the computing device, identify a point in the work using the master fingerprint; and present the data at the identified point in the work.

* * * * *